(12) United States Patent
Nishikawa

(10) Patent No.: US 12,244,361 B2
(45) Date of Patent: Mar. 4, 2025

(54) SPATIAL DATA CREATING APPARATUS, SPATIAL DATA CREATING METHOD, AND PROGRAM

(71) Applicant: NEC Corporation, Tokyo (JP)

(72) Inventor: Yoshiaki Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 661 days.

(21) Appl. No.: 17/601,483

(22) PCT Filed: Apr. 7, 2020

(86) PCT No.: PCT/JP2020/015675
§ 371 (c)(1),
(2) Date: Oct. 5, 2021

(87) PCT Pub. No.: WO2020/209253
PCT Pub. Date: Oct. 15, 2020

(65) Prior Publication Data
US 2022/0209875 A1    Jun. 30, 2022

(30) Foreign Application Priority Data

Apr. 11, 2019 (JP) ................. 2019-075357

(51) Int. Cl.
*H04B 17/391* (2015.01)
*H04B 17/309* (2015.01)
(Continued)

(52) U.S. Cl.
CPC ......... *H04B 17/391* (2015.01); *H04B 17/327* (2015.01); *H04W 4/023* (2013.01); *H04W 4/029* (2018.02)

(58) Field of Classification Search
None
See application file for complete search history.

(56) References Cited

U.S. PATENT DOCUMENTS

| 6,084,928 | A | 7/2000 | Kuwahara |
| 10,754,034 | B1 * | 8/2020 | Chamberlain ........ G01S 7/4817 |

(Continued)

FOREIGN PATENT DOCUMENTS

| JP | H11-344517 A | 12/1999 |
| JP | 2003-141215 A | 5/2003 |

(Continued)

OTHER PUBLICATIONS

International Search Report for PCT Application No. PCT/JP2020/015675, mailed on Jul. 7, 2020.

*Primary Examiner* — Jeffrey M Rutkowski
*Assistant Examiner* — Ning Li

(57) ABSTRACT

A spatial data creating apparatus receives, the data for estimation being used to create spatial data that associate a location of a target area with value relating the location based on data acquired from a first group of sensors, the data for evaluation being acquired from a second group of sensors installed at a different location(s), classifies the data for evaluation based on difference between the data for evaluation and the value of the spatial data, creates subspace data that forms a part of the spatial data using data acquired from the first group of sensors selected based on the location(s) at which the data for evaluation is acquired, the location(s) being classified by the data classifying part among the data for estimation, determines whether or not the subspace data is adopted by comparing the subspace data with the data for evaluation.

20 Claims, 29 Drawing Sheets

(51) Int. Cl.
*H04B 17/327* (2015.01)
*H04W 4/02* (2018.01)
*H04W 4/021* (2018.01)
*H04W 4/029* (2018.01)
*H04W 4/38* (2018.01)
*H04W 4/60* (2018.01)

(56) References Cited

U.S. PATENT DOCUMENTS

| | | | |
|---|---|---|---|
| 2011/0244901 A1* | 10/2011 | Sugahara | H04W 16/18 455/501 |
| 2014/0228048 A1* | 8/2014 | Saito | H04W 4/021 455/456.1 |
| 2014/0274119 A1* | 9/2014 | Venkatraman | H04W 64/00 455/456.1 |
| 2014/0274139 A1* | 9/2014 | Bilal | G01S 19/48 455/456.3 |
| 2015/0269438 A1* | 9/2015 | Samarasekera | G01C 21/3848 382/154 |
| 2017/0195838 A1 | 7/2017 | Mori et al. | |
| 2019/0028215 A1* | 1/2019 | Kitsunezuka | H04B 7/0634 |
| 2020/0084863 A1* | 3/2020 | Taylor | H04L 67/04 |
| 2020/0271450 A1* | 8/2020 | Gorur Sheshagiri | G06F 1/163 |

FOREIGN PATENT DOCUMENTS

| | | | | |
|---|---|---|---|---|
| JP | 2010-219918 A | 9/2010 | | |
| JP | 2015-010927 A | 1/2015 | | |
| JP | 2016-012916 A | 1/2016 | | |
| JP | 6159594 B2 | 7/2017 | | |
| JP | WO2017130877 | * | 8/2017 | H07B 17/309 |
| WO | 2010/067560 A1 | 6/2010 | | |
| WO | 2017/130877 A1 | 8/2017 | | |

* cited by examiner

SPATIAL DATA CREATING APPARATUS, SPATIAL DATA CREATING METHOD, AND PROGRAM

This application is a National Stage Entry of PCT/JP2020/015675 filed on Apr. 7, 2020 which claims priority from Japanese Patent Application 2019-075357 filed on Apr. 11, 2019, the contents of all of which are incorporated herein by reference, in their entirety.

REFERENCE TO RELATED APPLICATION

The present invention is based upon and claims the benefit of the priority of Japanese patent application No. 2019-075357 filed on Apr. 11, 2019, the disclosure of which is incorporated herein in its entirety by reference thereto. The present invention relates to a spatial data creating apparatus, a spatial data creating method, and program.

BACKGROUND

Field

As described in Patent Literature 1 and 2, there are known methods for calculating an estimated value by kriging method or IDW (Inverse Distance Weighting) method using observed values and observed quantities measured at a measurement point. In these methods, errors in the estimated values occur due to installation conditions of sensor and presence of obstacles around the sensor. Therefore, Patent Literatures 1 and 2 propose to improve accuracy by interpolation and weighted average using "confidence level" and "influence level" respectively.

Patent Literature 3 discloses a radio wave environment data correction system that is capable of correcting radio wave environment data using actual measurement data at measurement points in an area around a base station of a wireless communication system more accurately with a limited number of measurement points. According to this literature, this radio wave environment data correction system is equipped with a correction value determination means, a sub-area division means, a correction value calculation means, and a radio wave environment correction means. The correction value determining means determines the correction value for a sub-area, which is an area that divides the area based on the area use classification, which is a classification predetermined according to the layout of objects or spaces in the evaluation area, based on the actual measurement data at the measurement points that belong to the sub-area. Also, the sub-area dividing means divides the evaluation area into sub-areas based on the area use classification. The correction value calculation means calculates the correction value in the sub-area using the actual measurement data where the measurement point is inside the sub-area. Then, the radio wave environment correction means corrects the radio wave environment data inside the sub-area using the calculated correction value.

Patent Literature 4 discloses a method for setting transmission power of a wireless base station, which is said to be capable of appropriately setting the transmission power of wireless signals of an indoor base station and minimizing interference with an outdoor base station. According to the literature, the wireless base station has a receiving field strength measurement means, a building intrusion loss estimation means, and a transmission power setting means. The building intrusion loss estimation means estimates the building intrusion loss of the wireless signal in the building where the indoor wireless base station is installed, and the transmission power setting means sets the maximum transmission power of the indoor wireless base station based on the estimated building intrusion loss.

Patent Literature 5 discloses an information processing apparatus that is capable of appropriately grouping multiple wireless communication devices. In addition, Patent Literature 6 discloses a device for analyzing operations in a manufacturing process, which is capable of properly analyzing operation and quality data of the process.

[Patent Literature 1]
Japanese Patent No. 6159594
[Patent Literature 2]
International Publication Number WO2017/130877
[Patent Literature 3]
International Publication Number WO2010/067560
[Patent Literature 4]
Japanese Patent Kokai Publication No. 2010-219918A
[Patent Literature 5]
Japanese Patent Kokai Publication No. 2016-12916A
[Patent Literature 6]
Japanese Patent Kokai Publication No. 2003-141215A

SUMMARY

The following analysis is given by the present inventor. As described in Patent Literatures 1 and 2, methods for calculating estimates using the kriging and IDW methods have a problem of providing errors in estimated values. Patent Literatures 1 and 2 propose to improve accuracy by interpolation and weighted averaging, using "confidence level" and "influence level" respectively. However, there is a problem that the methods in Patent Literatures 1 and 2 require preparation of information to determine these "confidence levels" and "influence level". In fact, since the "confidence level" in Patent Literature 1 is determined based on reference information (external reference information) input from an external device, it is necessary to prepare this external reference information. This is also the case with Patent Literature 2, which is configured to evaluate degree of influence by obstacles (shields) by performing a pre-evaluation step.

It is an object of the present invention to provide a spatial data creating apparatus, spatial data creating method, and program capable of contributing to improvement of accuracy in creating spatial data from data for estimation, using an approach different from each of the background technologies.

According to a first aspect, there is provided a spatial data creating apparatus, comprising a receiving part that receives respectively data for estimation and data for evaluation, the data for estimation being used to create spatial data that associate a location of a target area with value relating the location based on data acquired from a first group of sensors installed in the target area, the data for evaluation being acquired from a second group of sensors installed at a different location(s) from a location(s) at which the first group of sensors installed in the target area; a data classifying part that classifies the data for evaluation based on difference between the data for evaluation and the value of the spatial data corresponding to the location at which the data for evaluation is acquired; a subspace data creating part that creates subspace data that forms a part of the spatial data using data acquired from the first group of sensors selected based on the location(s) at which the data for evaluation is acquired, the location(s) being classified by the data classifying part among the data for estimation; and a subspace data evaluating part that determines whether or not the subspace data is adopted by comparing the subspace data with the data for evaluation.

According to a second aspect, there is provided a spatial data creating method, comprising receiving respectively data for estimation and data for evaluation, the data for estimation being used to create spatial data that associate a location of a target area with value relating the location based on data acquired from a first group of sensors installed in the target area, the data for evaluation being acquired from a second group of sensors installed at a different location(s) from a location(s) at which the first group of sensors installed in the target area; classifying the data for evaluation based on difference between the data for evaluation and the value of the spatial data corresponding to the location at which the data for evaluation is acquired; creating subspace data that forms a part of the spatial data using data acquired from the first group of sensors selected based on the location (s) at which the data for evaluation is acquired, the location (s) being classified by the data classifying part among the data for estimation; and determining whether or not the subspace data is adopted by comparing the subspace data with the data for evaluation. The method is associated with a specific machine: a computer that uses the data from the first and second groups of sensors to create spatial data.

According to a third aspect, there is provided a program executing a process of receiving respectively data for estimation and data for evaluation, the data for estimation being used to create spatial data that associate a location of a target area with value relating the location based on data acquired from a first group of sensors installed in the target area, the data for evaluation being acquired from a second group of sensors installed at a different location(s) from a location(s) at which the first group of sensors installed in the target area; classifying the data for evaluation based on difference between the data for evaluation and the value of the spatial data corresponding to the location at which the data for evaluation is acquired; creating subspace data that forms a part of the spatial data using data acquired from the first group of sensors selected based on the location(s) at which the data for evaluation is acquired, the location(s) being classified by the data classifying part among the data for estimation; and determining whether or not the subspace data is adopted by comparing the subspace data with the data for evaluation. Further, this program can be stored in a computer-readable (non-transitory) storage medium. In other words, the present invention can be realized as a computer program product. The program can be input to a computer apparatus via an input device or an external communication interface, and stored in a memory device to drive a processor according to a predetermined step or process, and display results of the process, including intermediate states, step by step via a display device if necessary. Or it can communicate with outside through a communication interface. As an example, a computer apparatus for this purpose typically has a processor that can be connected to each other by a bus, a storage device, an input device, a communication interface, and a display device if necessary.

According to the present invention, it is possible to improve accuracy in creating spatial data from data for estimation. In other words, the present invention transforms the spatial data creating apparatus shown in background technology into a configuration that drastically improves accuracy in creating spatial data.

PREFERRED MODES

Figure 1:
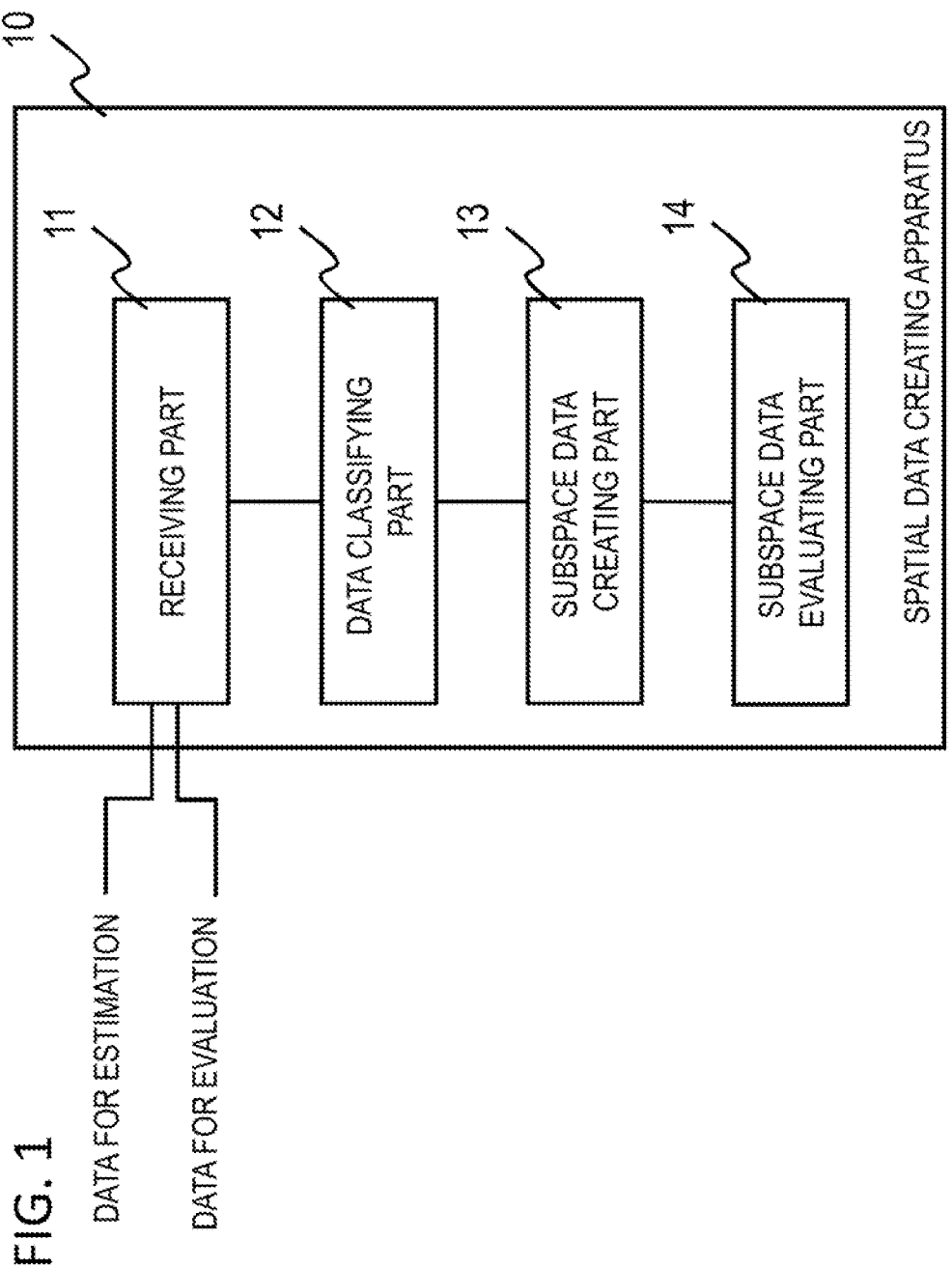
FIG. 1 is a drawing illustrating a configuration of an example embodiment of the present invention.

First, an outline of an example embodiment of the present invention will be given with reference to the drawings. It should be noted that the drawing reference signs in the outline are given to each element for convenience as an example to facilitate understanding and are not intended to limit the present invention to the illustrated aspects. Further, connection lines between blocks in the drawings referred to in the following description can be both bidirectional and unidirectional. A unidirectional arrow schematically shows the main flow of a signal (data) and does not exclude bidirectionality. A program is executed via a computer apparatus, and the computer apparatus is equipped with, for example, a processor, a storage device, an input device, a communication interface, and a display device if necessary. The computer apparatus is also configured to be able to communicate with devices (including computers) inside or outside the apparatus via the communication interface, whether wired or wireless. Further, although the input/output connection points of each block in the drawings have ports or interfaces, these are not illustrated. Also, in the following explanation, "A and/or B" is used in the meaning of at least one of A and B.

As shown in FIG. 1, the present invention in an exemplary embodiment thereof can be realized by a spatial data creating apparatus 10 comprising a receiving part 11, a data classifying part 12, a subspace data creating part 13, and a subspace data evaluating part 14.

Data for estimation and data for evaluation are input to the receiving part 11, respectively. The data for estimation is data for creating spatial data in which a location in a target area and a value related to that location are associated. This data for estimation is data obtained from a first group of sensors located in the target area. On the other hand, data for evaluation is actual measurement data obtained from a second group of sensors installed at a different location from the location where the first group of sensors is installed in the target area.

Figure 2:
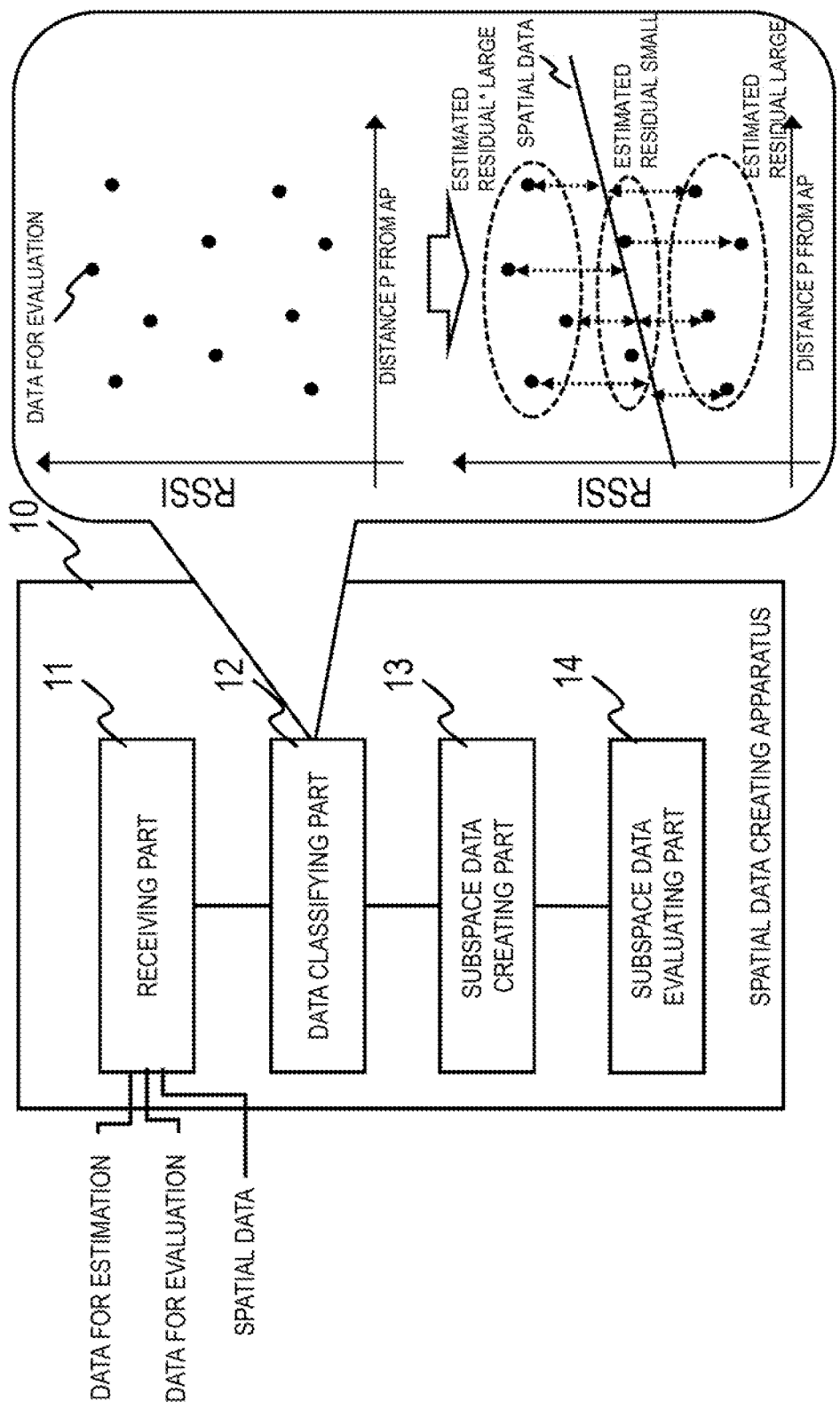
FIG. 2 is a drawing illustrating an operation of an example embodiment of the present invention.

The data classifying part 12 classifies the data for evaluation based on the difference between the data for evaluation and the value of the spatial data corresponding to the acquisition location of the data for evaluation. Upper black circle(s) in a right-side balloon in FIG. 2 indicates the data for evaluation, which is actual measured value(s) at a distance P from a certain AP (access point). The data classifying part 12 classifies the data for evaluation based on the difference between this evaluation data and the value of the spatial data described above that corresponds to the acquisition location of each data for evaluation. For example, in this embodiment, as shown in a lower broken line(s) in the right-side balloon of FIG. 2, the residual is focused on as a concrete example of the difference (difference). In this case, the data classifying part 12 classifies the data for evaluation into two groups, one in which the residuals are largely on the + (positive) side and the other in which the residuals are largely on the − (negative) side.

Figure 3:
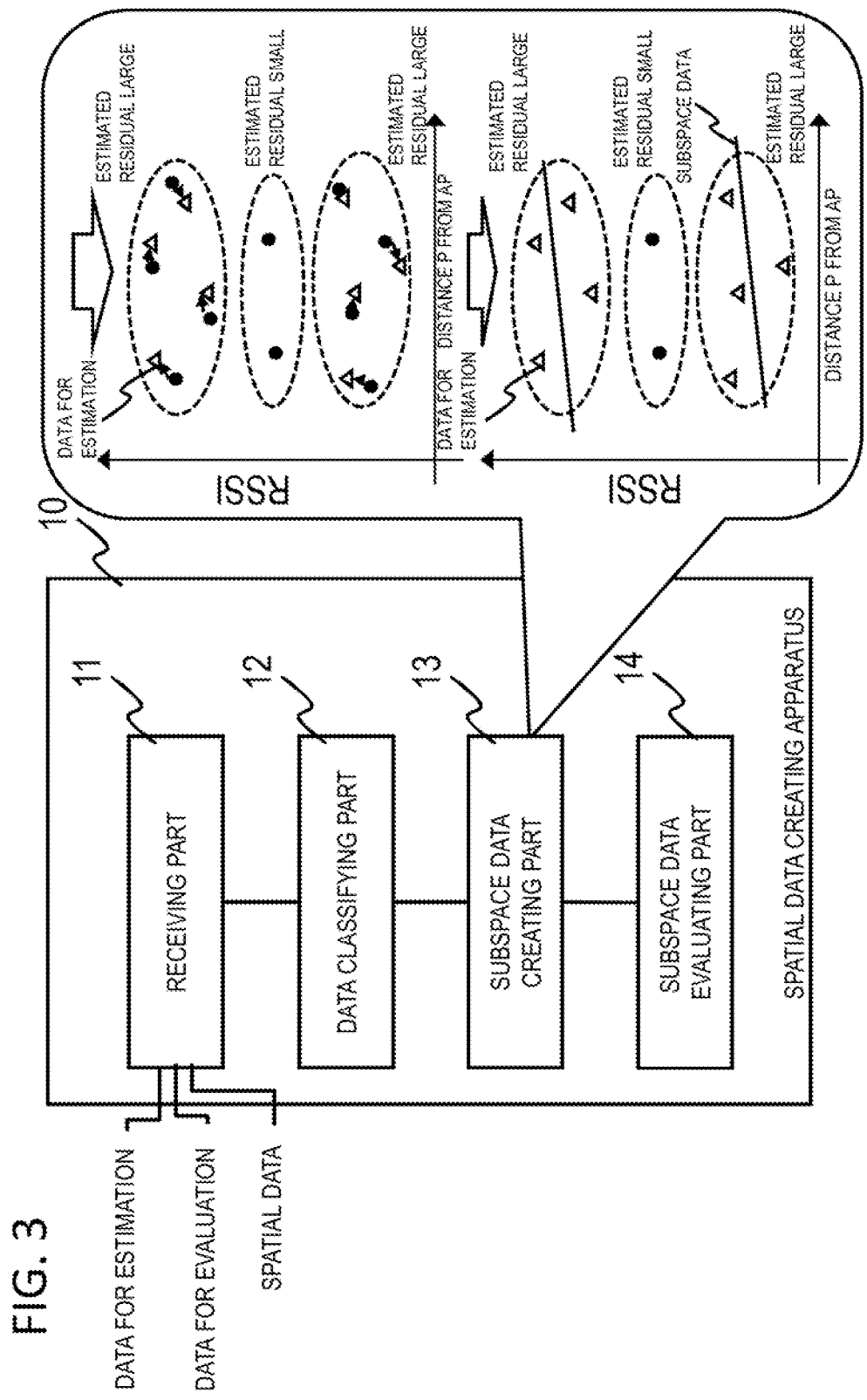
FIG. 3 is a drawing illustrating an operation of an example embodiment of the present invention.

The subspace data creating part 13 creates subspace data that forms a part of the spatial data by using the data obtained from the first sensor group selected based on the acquisition location of the data for evaluation classified by the data classifying part among the data for estimation. For example, the subspace data creating part 13 selects the data for estimation that is close to the acquisition location of the data for evaluation, as shown in the upper part in the right-side balloon in FIG. 3. Then, the subspace data creating part 13 creates the subspace data using the selected estimation data, as shown in the lower part of the right-side balloon in FIG. 3. As a method for creating the subspace data, a method selected from among the kriging method, IDW method, etc. can be used based on objective in use and expected accuracy of the spatial data. Of course, the subspace data may be created using a method identical to the spatial data.

Figure 4:
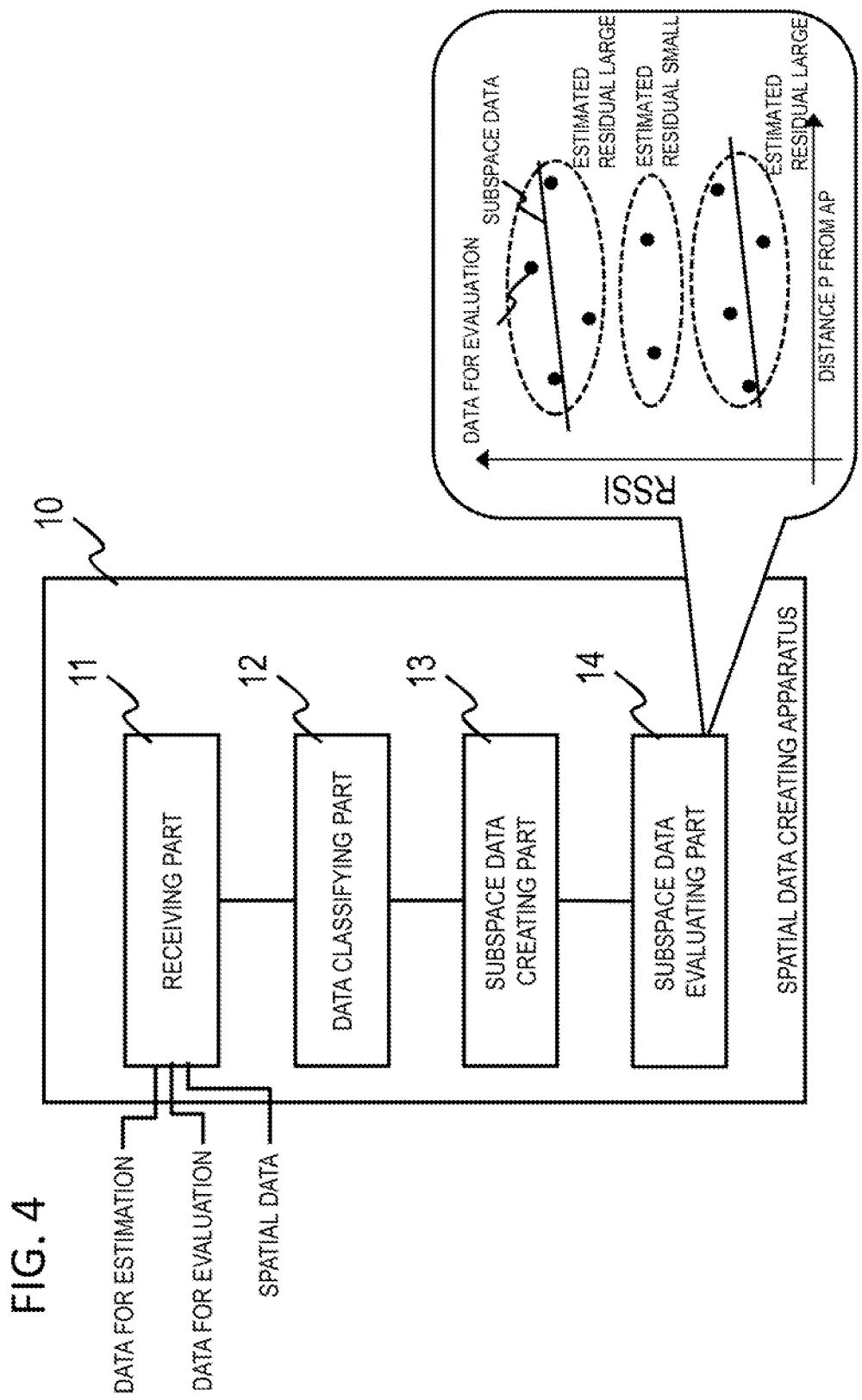
FIG. 4 is a drawing illustrating an operation of an example embodiment of the present invention.

The subspace data evaluating part 14 decides whether or not to adopt the subspace data by comparing the subspace data with the data for evaluation. For example, the subspace data evaluating part 14 decides whether or not to adopt the subspace data by comparing the subspace data with the data for evaluation, as shown in the right-side balloon in FIG. 4. In an example shown in FIG. 4, the subspace data evaluating part 14 decides to adopt the subspace data because a good result is obtained as a result of comparison between the subspace data and the data for evaluation. Such subspace data can be used as spatial data to supplement inaccurate spatial data. Concretely, in estimating the data at a certain location in the target area, it is possible to obtain good estimates by using the subspace data in preference to the spatial data. The estimated values can also be used for location estimation and map creation.

As described above, it is possible to improve accuracy in the creation of spatial data from data for estimation.

First Example Embodiment

The following is a detailed description of a first example embodiment of the present invention applied to the creation of spatial data for quality evaluation of wireless networks, with reference to the drawings. First, definitions are given for the terms used in the following description.

Spatial data: Data configured by a set of location information indicating a location in a certain space and feature value(s) at that location.

Spatial data estimation: A process of creating spatial data by estimating the distribution of feature value(s) in space. For example, typical methods include, but are not limited to, spline interpolation and kriging. For example, the IDW method described in the background is also included.

Data for estimation refers to data that maps the location of the first sensor in the target area sampled to perform the spatial data estimation described above to the feature value(s).

Data for evaluation is data that maps feature value(s) measured by a second sensor located in the target area to the position of the second sensor. The evaluation data is used to classify the evaluation data and to adopt or reject subspace data.

Classification means to divide an entire data into a number of groups. Classification by data-for-evaluation classifying part 106 refers to grouping the data for evaluation. Therefore, "performing spatial data estimation independently for each classification" means that spatial data estimation is performed using the data for estimation that belongs to each classified set.

Figure 5:
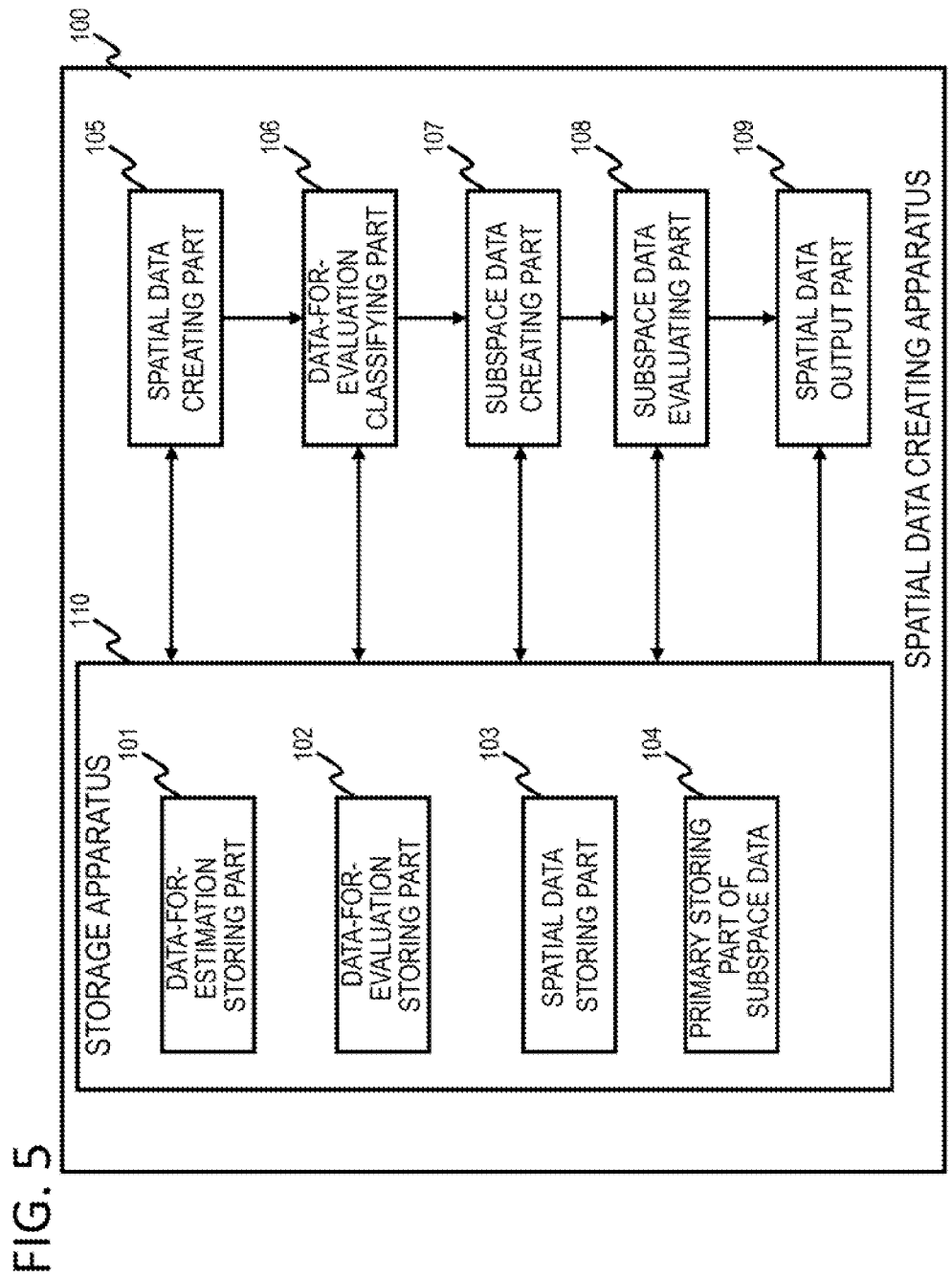
FIG. 5 is a drawing illustrating a configuration of a spatial data creating apparatus according to a first example embodiment of the present invention.

FIG. 5 is a drawing illustrating a configuration of a spatial data creating apparatus of the first example embodiment of the present invention. Referring to FIG. 5, a spatial data creating part 105, a data-for-evaluation classifying part 106, a subspace data creating part 107, a subspace data evaluating part 108, a spatial data output part 109, and a storage apparatus 110 are illustrated.

The storage apparatus 110 functions as a data-for-estimation storing part 101, a data-for-evaluation storing part 102, a spatial data storing part 103, and a primary storing part 104 of subspace data.

The data-for-estimation storing part 101 stores data for estimation (data-for-estimation) used for the spatial data estimation described above.

Figure 6:
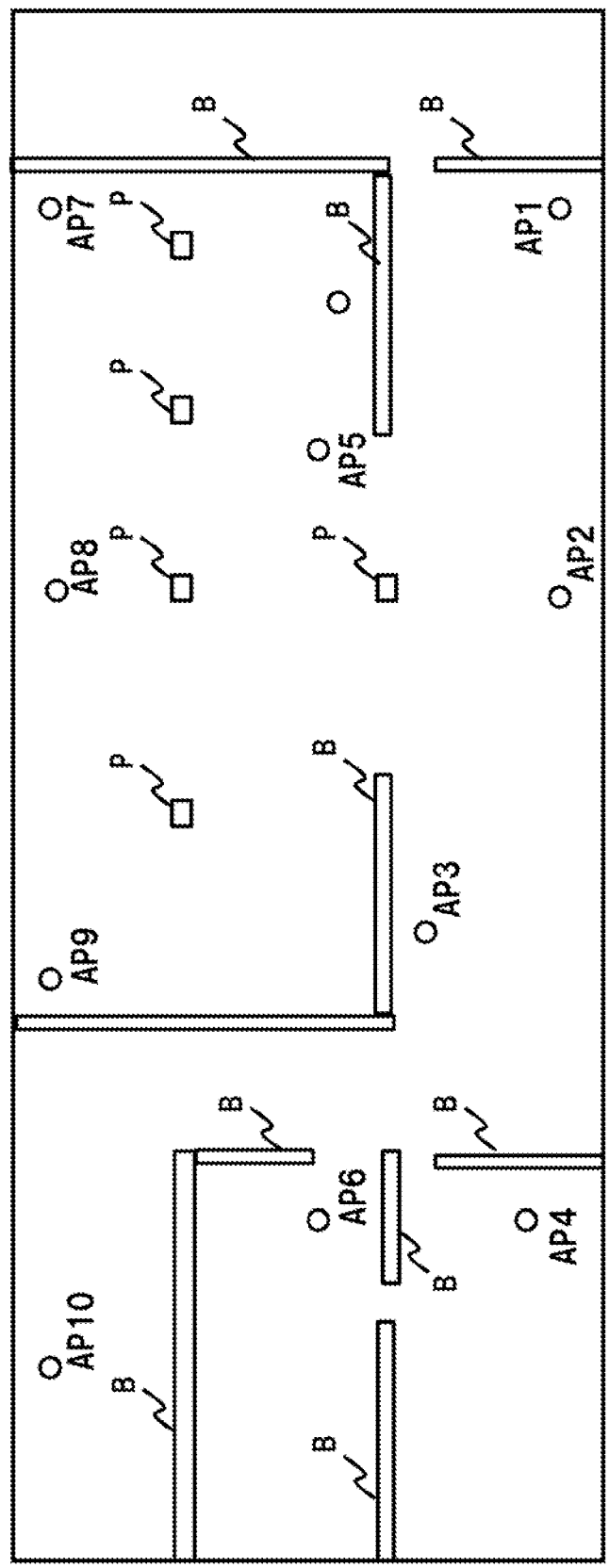
FIG. 6 is a drawing illustrating an example of a target area for the spatial data creating apparatus of the first example embodiment of the present invention.

For example, the radio wave reception strength at a time radio waves transmitted from each of the APs 1 to 10 located in a target area in FIG. 6 are received at each of the AP1 to AP10 positions can be used as data for estimation. A first sensor can be installed at each of these AP1 to AP10 locations. Any one AP transmits radio waves as a transmitting station, and the other APs measure the received signal strength (RSSI) as the first sensor. This allows us to obtain data for estimation that is associated with the location(s) of the APs. In FIG. 6, B is a barrier and P is a pillar.

The spatial data storing part 103 stores spatial data created by the spatial data creating part 105 using the above data for estimation. Spatial data stored in the spatial data storing part 103 is, for example, illustrated in FIG. 22. By creating and synthesizing such spatial data for each of AP, it is possible to create a spatial data map for evaluating the radio wave quality of the target area.

Figure 7:
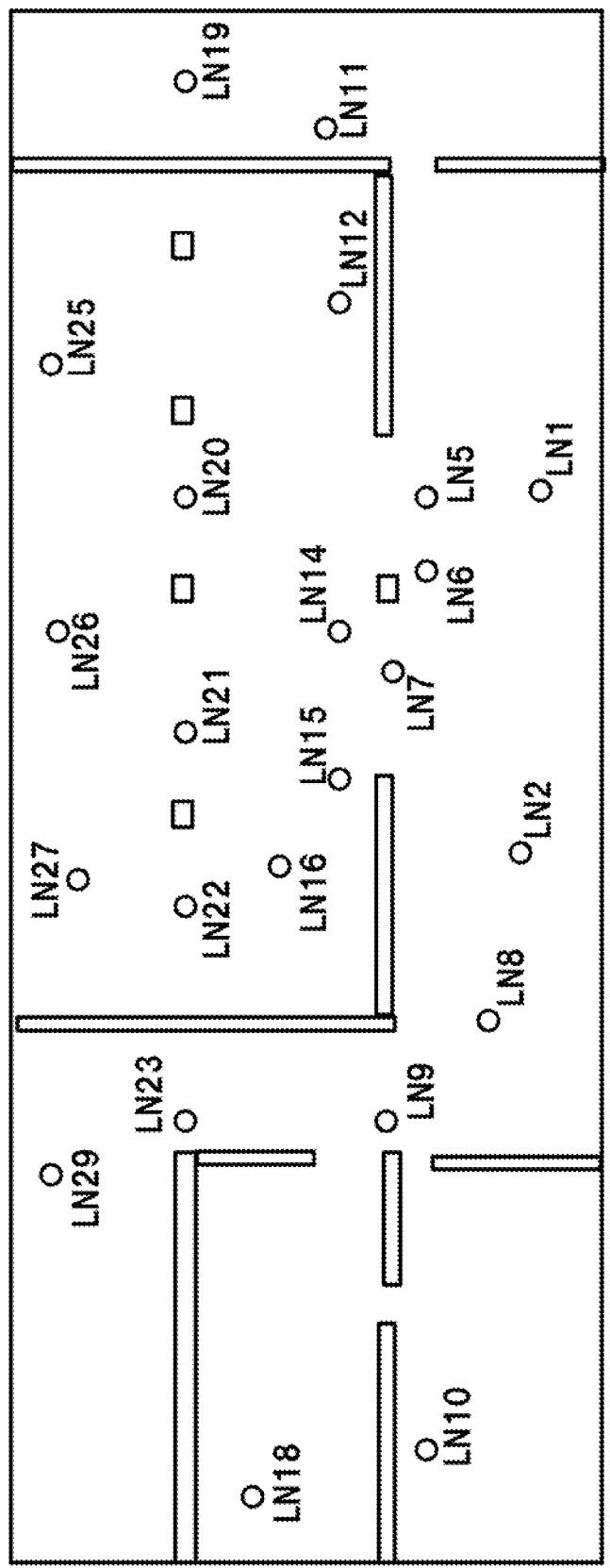
FIG. 7 is a drawing illustrating an example of placement of a second sensor in the target area of the spatial data creating apparatus according to the first example embodiment of the present invention.

The data-for-evaluation storing part 102 stores data for evaluation (data-for-evaluation). As the data for evaluation, an actual measured value of the received signal strength (RSSI) at any position of the radio wave transmitted from each of APs can be used. FIG. 7 illustrates an example of the arrangement of measurement points LN1 to LN29 of the data for evaluation in the target area. The measurement points LN1 to LN29 can be placed uniformly in the target area, but they can also be placed with emphasis in areas where highly accurate estimates are required. Radio waves transmitted by any one AP as a transmitting station are received by these LN1-LN29 as a second sensor, and by measuring the received signal strength (RSSI) as a feature value(s), data for evaluation associated with the location(s) can be obtained.

The primary storing part 104 of subspace data performs grouping of the above measurement points LN1 to LN29 and stores subspace data created using estimated data for each group. While the spatial data described above represents estimated values for entire target area, this subspace data is estimated values for a part (or parts) of the target area (which does not have to be a physically contiguous area).

The spatial data creation part 105 creates spatial data using the spatial data estimation described above, and stores it in the spatial data storing part 103.

The data-for-evaluation classifying part 106 functions as a data classifying part that classifies (groups) the data for evaluation based on the difference between data for evaluation and spatial data. For example, the data-for-evaluation classifying part 106 classifies data for evaluation based on the residual difference (may be termed as "residual") between spatial data (see FIG. 22) stored in the spatial data storage part 103 and data for evaluation measured at the measurement points LN1 to LN29. Here, the residual (dBm; decibel millimeter) is an estimated value of the spatial data value of the data for evaluation. Therefore, if the residual difference is a positive value, the larger the value, the worse the actual radio wave reception strength is at that location concerned than the estimated value. Conversely, when the residual difference is negative, the larger the value (absolute value), the better the actual radio wave reception strength is than the estimated value.

Figure 8:
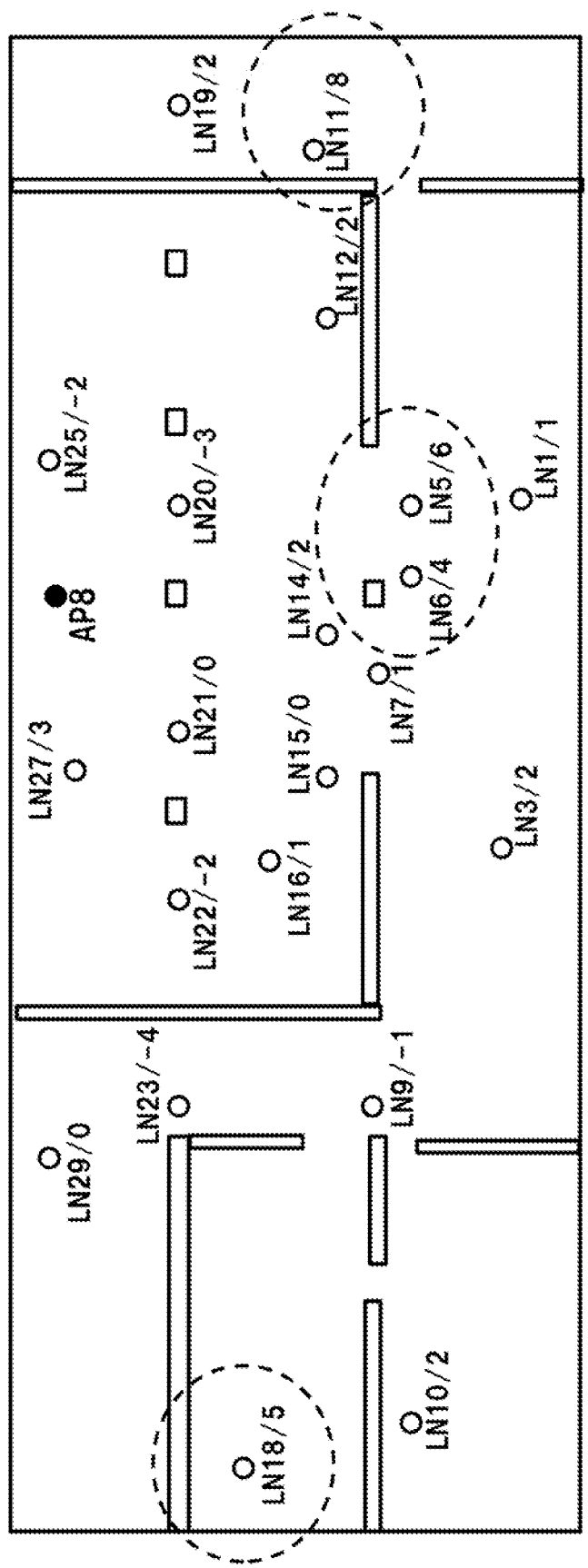
FIG. 8 is a drawing illustrating a location in which residuals between second sensor measurements and spatial data of radio waves from AP8 in FIG. 6 are significantly on positive side.

FIG. 8 is a drawing illustrating residual difference(s) of the spatial data of AP8 and the RSSIs at LN1 to LN29. The "LNxx/yy" in the figure indicates that the residual at any measurement point LNxx is "yy" (xx is a natural number from 1 to 29 in this system). In the case of FIG. 8, residual differences of 3 or more are detected at locations of circles indicated by broken lines. Specifically, LN5, LN6, LN11, and LN18 indicate that actual signal condition is poor.

Figure 9:
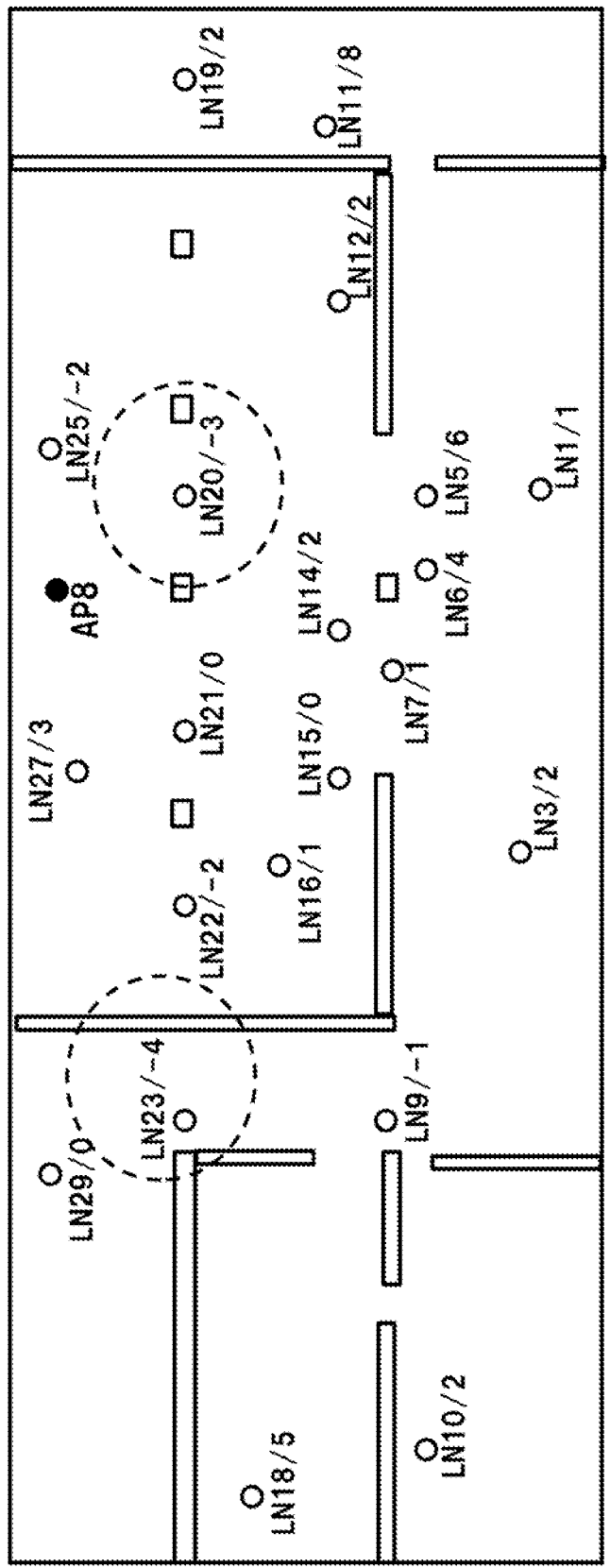
FIG. 9 is a drawing illustrating locations in which residuals between second sensor measurements and spatial data of radio waves from AP8 in FIG. 6 are significantly on negative side.

On the other hand, if the residual difference is negative and its value (absolute value) is large, it means that the actual radio wave situation is better than the estimated value. In the case of FIG. 9, locations with residual differences of −3 or less are detected in the broken-line circles. Concretely, LN20 and LN23 indicate that actual radio wave conditions are better than the estimated values.

Figure 10:
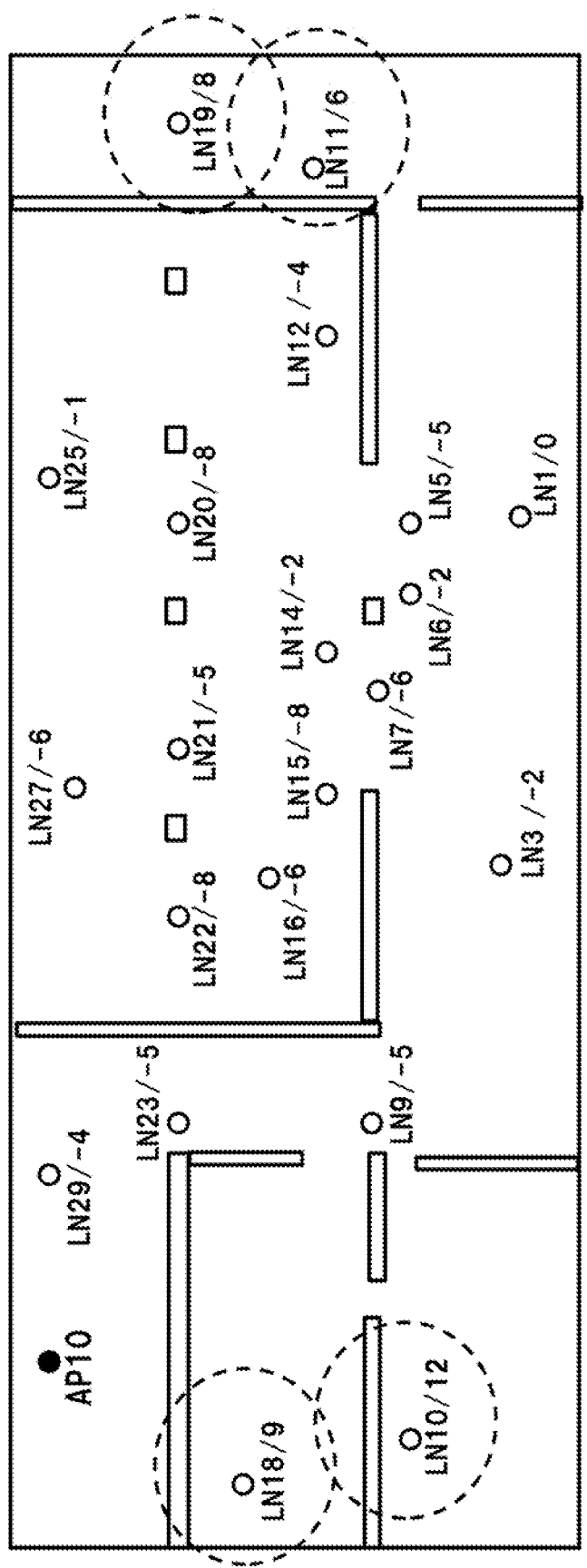
FIG. 10 is a drawing illustrating locations in which residuals between second sensor measurements and spatial data of radio waves from AP10 in FIG. 6 are significantly on positive side.
Figure 11:
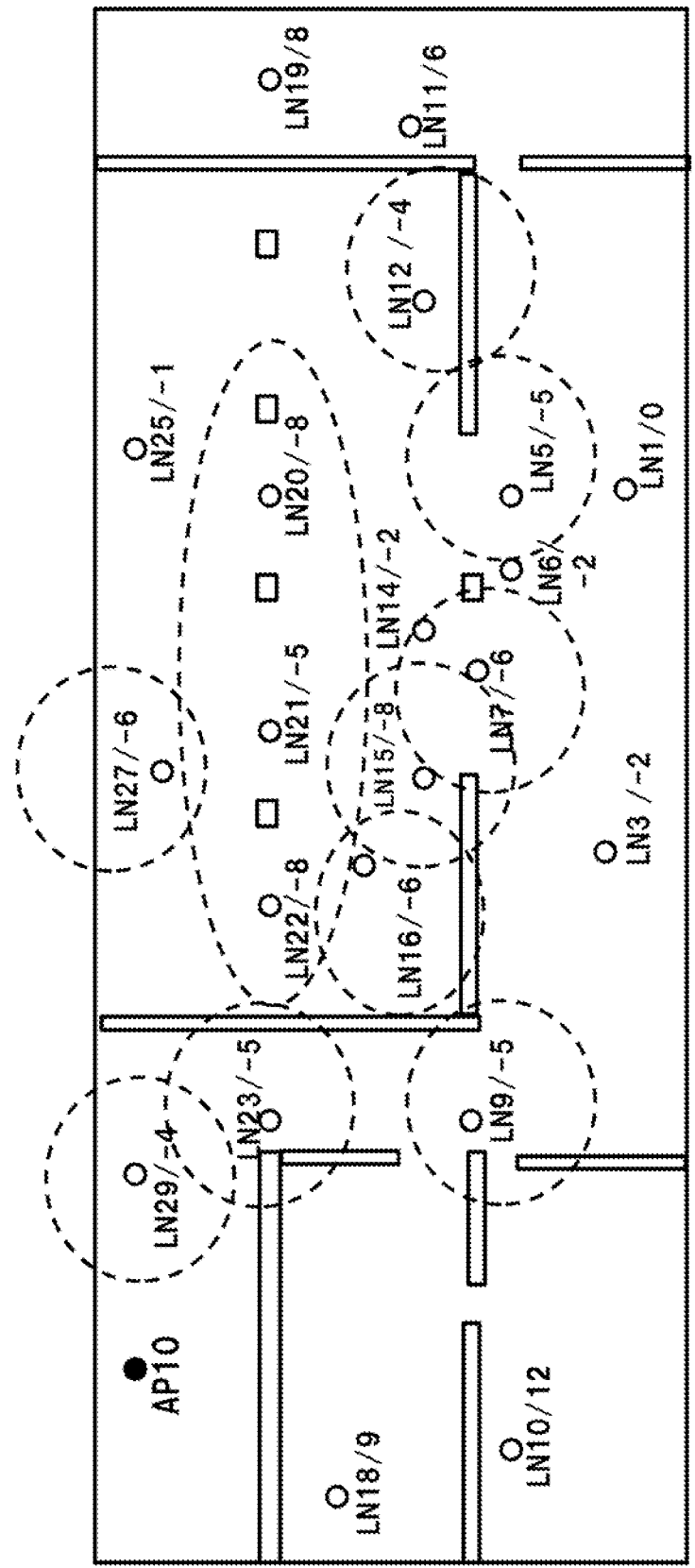
FIG. 11 is a drawing illustrating locations in which residuals between second sensor measurements and spatial data of radio waves from AP10 in FIG. 6 are significantly on negative side.

For radio waves transmitted from other APs, the data-for-evaluation classifying part 106 calculates residual differences with spatial data in the same way as for AP 8. FIG. 10 is a drawing illustrating spatial data of AP10 and residual differences of RSSI in LN1 to LN29. In case of FIG. 10, locations with residuals of 3 or more are detected in the broken-line circles. Similarly, in FIG. 11, the broken-line circles indicate that residual differences of −3 or less are detected.

Figure 12:
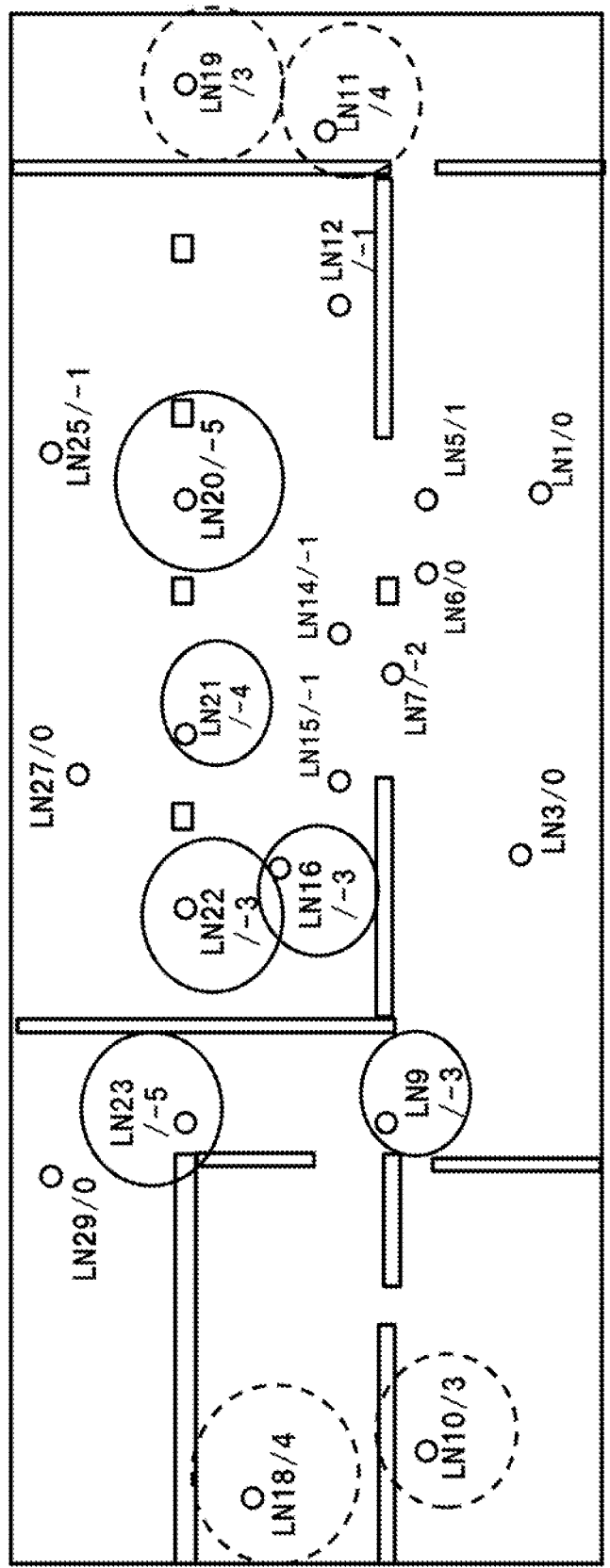
FIG. 12 is a drawing illustrating locations with large absolute values of average residuals and residual averages between the second sensor measurements of radio waves from each AP and spatial data in FIG. 6.

The data-for-evaluation classifying part 106 according to this example embodiment calculates spatial data of each AP as described above and average values of residual differences of RSSI in LN1 to LN29, and classifies (groups) data for evaluation based on the results. For example, as shown in FIG. 12, when spatial data of each AP and average values of residual differences of RSSI in LN1 to LN29 are calculated, the data-for-evaluation classifying part 106 classifies data for evaluation in which average values of residual differences are positive and large into the first group (see broken-line circles in FIG. 12). Similarly, the data-for-evaluation classifying part 106 classifies the data for evaluation whose residual difference average value is negative and whose absolute value is large into the second group (see the solid circle in FIG. 12).

For each of the classified groups, the subspace data creating part 107 selects the nearest estimation data from the measurement points of data-for-evaluation, and creates subspace data using that set of estimation data. The subspace data created by the subspace data creating part 107 is temporarily stored in a primary storing part of subspace data 104.

The subspace data evaluating part 108 compares data-for-evaluation with subspace data, and calculates residual differences (residual differences of subspace data). Then, the subspace data evaluating part 108 compares total and average values of residual differences of subspace data with total and average values of residual differences between spatial data and evaluation data calculated by the data-for-evaluation classifying part 106. As a result of the above comparison, if the residual differences of the subspace data are smaller, the subspace data evaluating part 108 adopts the subspace data. Furthermore, the subspace data evaluating part 108 saves the subspace data in the spatial data storing part 103.

On the other hand, if residual differences of subspace data are larger, the subspace data evaluating part 108 determines that the subspace data is not adopted because accuracy of the subspace data is degraded more than that of the spatial data. The subspace data evaluating part 108 does not save the subspace data to the spatial data storing part 103.

Figure 22:
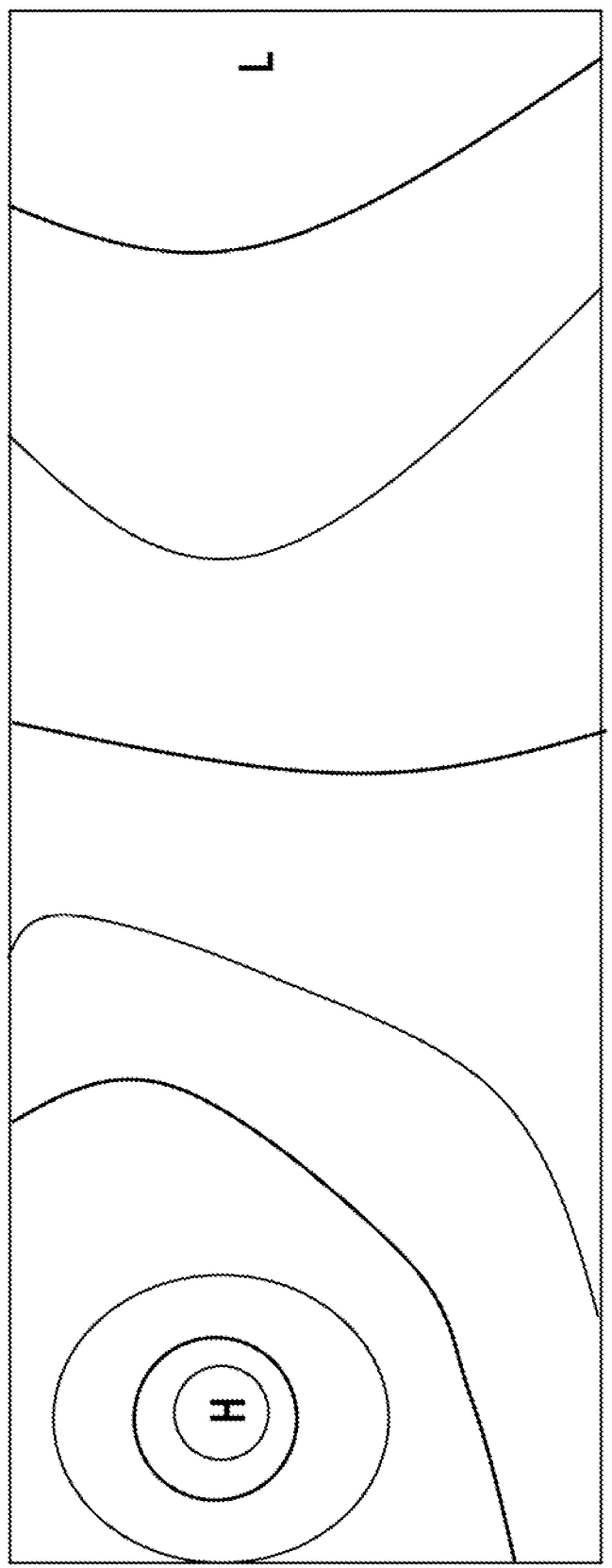
FIG. 22 is a drawing illustrating an example of spatial data map presented by the spatial data creating apparatus according to the third example embodiment of the present invention.

The spatial data output part 109 outputs the spatial data stored in the spatial data storing part 103 in a predetermined manner after judgment by the subspace data evaluating part 108. This predetermined configuration can be a two-dimensional radio wave map as shown in FIG. 22, a three-dimensional radio wave map, or various other configurations.

In addition, various data such as data for estimation and data-for-evaluation stored in the above-mentioned storage apparatus 110 are input from outside via input device(s) and communication interface(s), which are omitted in figures. Therefore, in this example embodiment, these input apparatus(es) and communication interface(s) function as input part.

Figure 13:
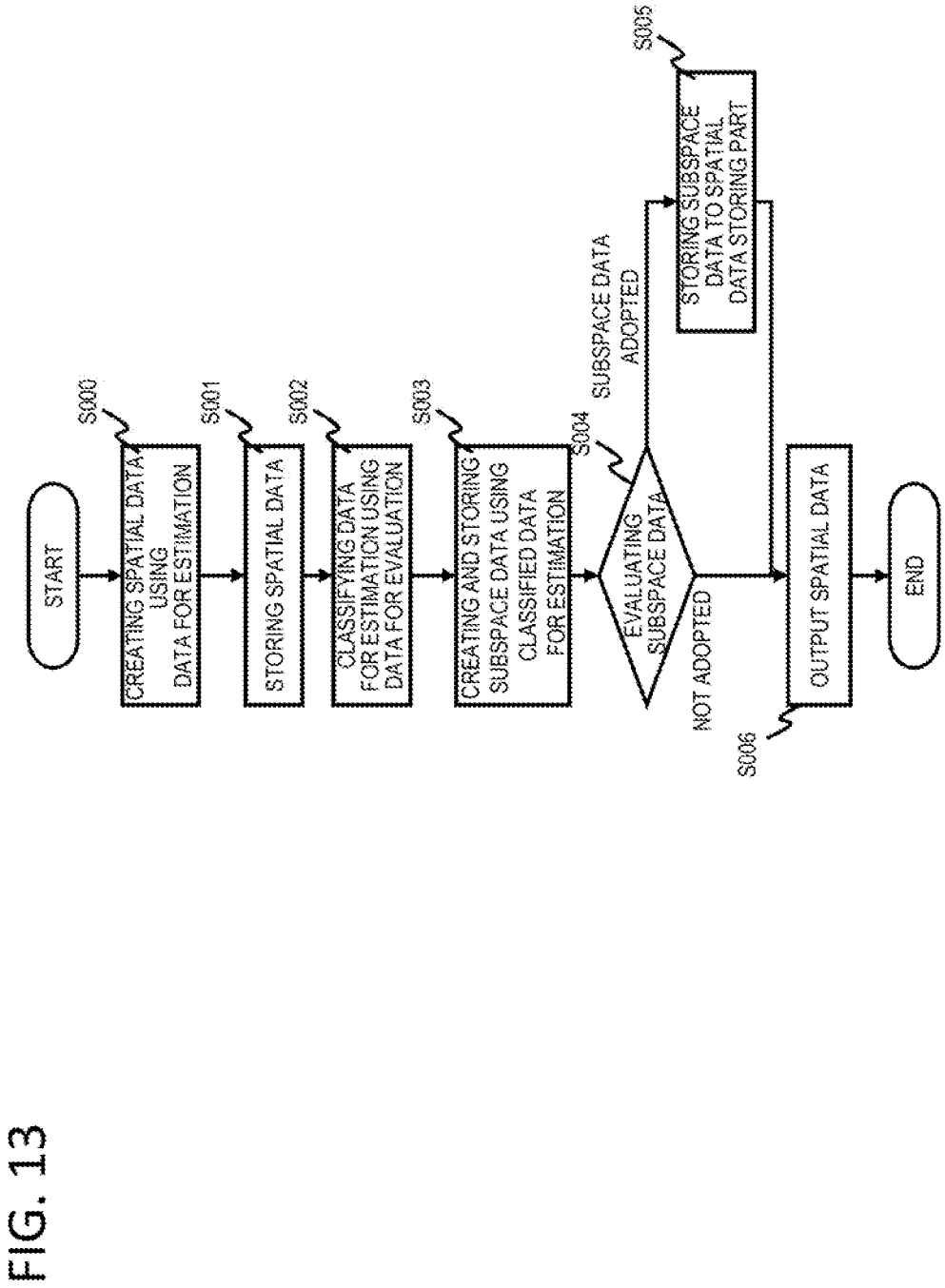
FIG. 13 is a flowchart illustrating operations of the spatial data creating apparatus according to the first example embodiment of the present invention.

Next, operations of this example embodiment will be described in detail with reference to drawings. FIG. 13 is a flow chart illustrating operations of the spatial data creating apparatus 100 of the first example embodiment of present invention. Referring to FIG. 13, first, the spatial data creating apparatus 100 reads data for estimation from the data storing part 101 to create spatial data for a target area (step S000).

Next, the spatial data creating apparatus 100 saves created spatial data in the spatial data storing part 103 (Step S001).

Next, the spatial data creating apparatus 100 calculates residual differences between the created spatial data and evaluation data in the data-for-evaluation storing part 102, and classifies the data-for-evaluation based on the values. For example, a group [of LNs] with an average residual difference value of 3 dB or more in FIG. 12 is classified as S1 group. In this case, LN10, LN11, LN18, and LN19 belong to the S1 group. In the same way, a group [of LNs] with a residual difference average value of −3 dB or less in FIG. 12 is grouped together as S2 group. In this case, LN9, LN16, LN20 to LN23 will belong to the S2 group.

Figure 14:
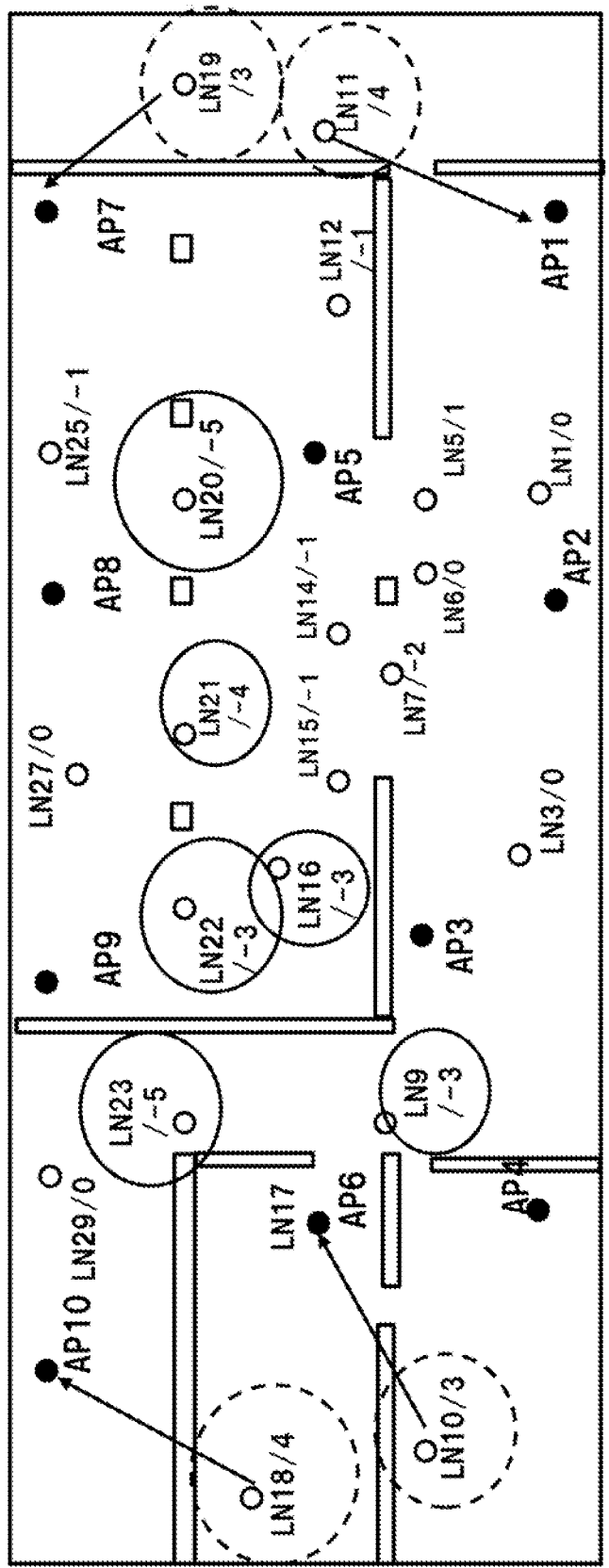
FIG. 14 is a drawing for explaining an operation of selecting nearest data for estimation from data for evaluation in FIG. 12.

Furthermore, the spatial data creating apparatus 100 selects data for estimation that is measured at a location closest to a location of the classified data for evaluation. This completes the classification of the data for estimation (Step S002). FIG. 14 illustrates an example of selecting data for estimation for LN10, LN11, LN18, and LN19 in S1 group. The reason for selecting the nearest data for estimation resides in that it is assumed that the closer the distance, the more similar the environment is. An algorithm to search for such nearest neighbor is the k-nearest neighbor method. Of course, if information on installation location and environment of each of data for estimation and data for evaluation is available, data for estimation that is not the nearest neighbor but is similar in environment, etc., may be selected. For example, instead of selecting AP6, which is close to LN10 in FIG. 12, an algorithm may be used to select AP4, whose environment is similar to LN17 and LN18 on the point that it is outside the area enclosed by the shield B.

Next, the spatial data creating apparatus 100 performs estimation of spatial data independently per each classification using classified data for estimation. The spatial data creating apparatus 100 saves created subspace data in the primary storing part of subspace data 104 (Step S003).

Next, the spatial data creating apparatus 100 evaluates created subspace data (Step S004). The spatial data creating apparatus 100 calculates residual differences of data for evaluation and the spatial data created in step S000, and residual differences of data for evaluation and the subspace data created in step S003, respectively. If it is determined that residual difference between the data for evaluation and the subspace data created in step S003 is smaller, the spatial data creating apparatus 100 determines that the subspace data is adopted ("Adopt subspace data" in step S004).

On the other hand, if it is determined that residual difference between the data for evaluation and the subspace data created in step S003 is larger, the spatial data creating apparatus 100 determines that the subspace data is not adopted ("Not Adopt" in step S004).

If it is determined that the subspace data is to be adopted, the spatial data creating apparatus 100 stores the subspace data in the spatial data storing part 103 (Step S005).

The spatial data creating apparatus 100 outputs spatial data stored in the spatial data storing part 103 (Step S006). At this time, if subspace data is stored in the spatial data storing part 103, the spatial data creating apparatus 100 outputs a part(s) of spatial data that overlaps with subspace data by replacing such part(s) with contents of the subspace data. As a result, the part(s) of the spatial data for which absolute value(s) of the residual differences is determined to be large in step S002 is replaced with the subspace data to improve the accuracy.

Figure 15:
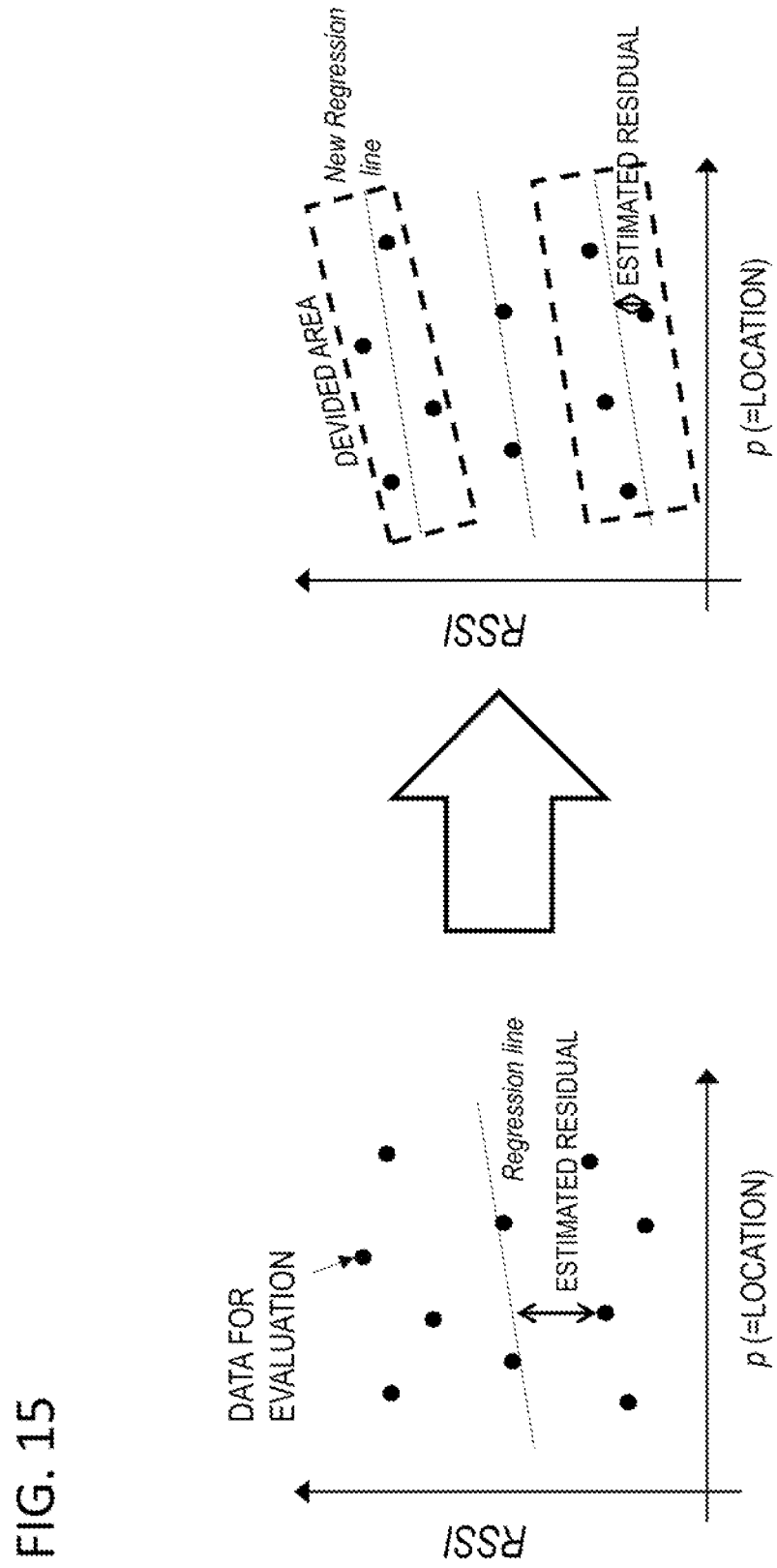
FIG. 15 is a drawing for explaining a concept of subspace data created by the spatial data creating apparatus according to the first example embodiment of the present invention.
Figure 16:
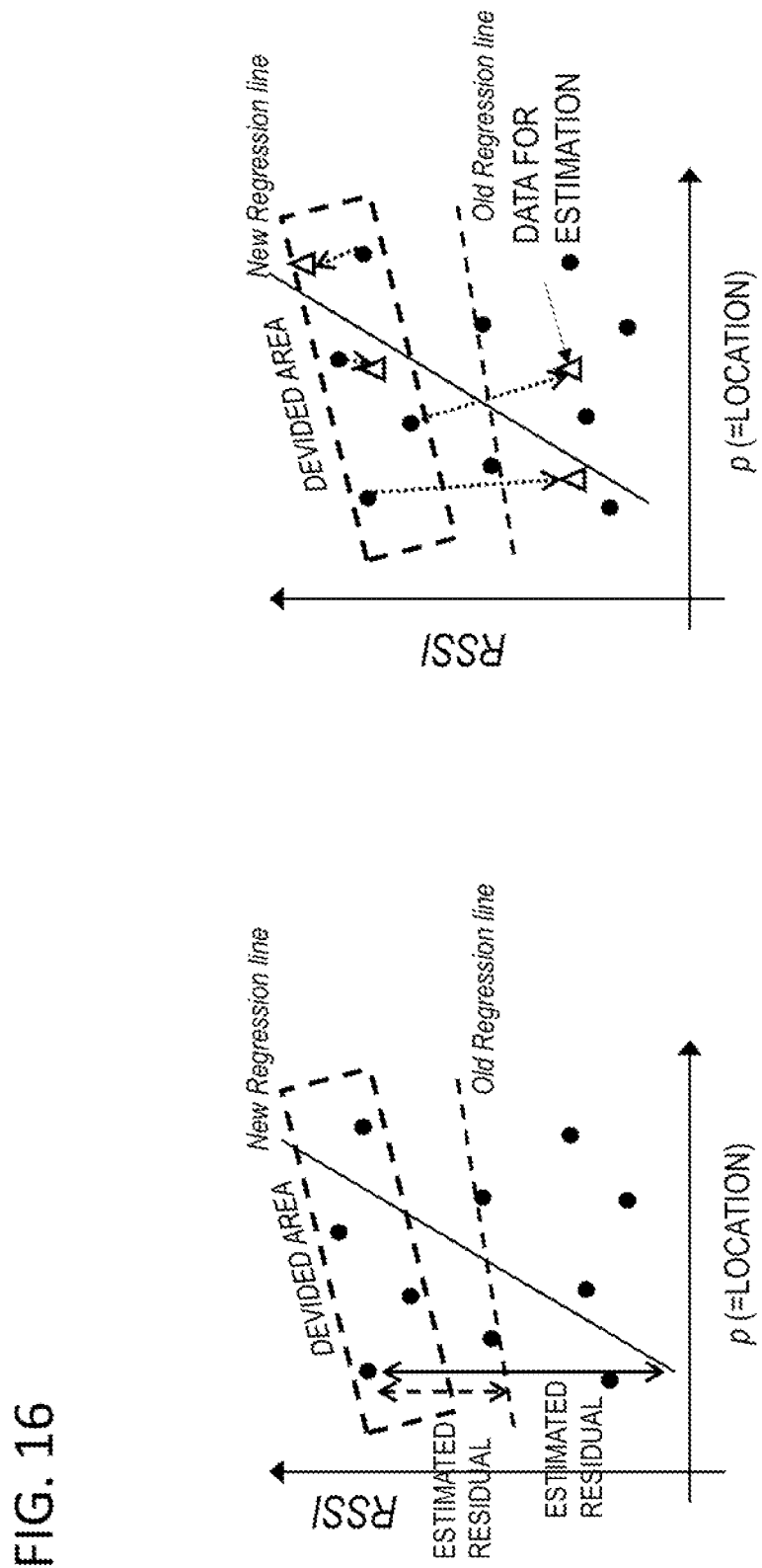
FIG. 16 is a drawing for explaining a case in which the subspace data created by the spatial data creating apparatus according to the first example embodiment of the present invention is not adopted.

FIG. 15 and FIG. 16 are a drawing illustrating effect of this example embodiment. Black dots on the left side of figure of FIG. 15 represent data-for-evaluation. Regression line in the figure shows regression line obtained from data for estimation by an appropriate method. If RSSI (Received Signal Strength Indication) according to location p (distance from a predetermined origin) of each AP is estimated with this regression line, deviation from data-for-evaluation (estimated residual differences) will occur, as shown in the left figure of FIG. 15.

On the other hand, when the present invention is applied, as shown in the figure on the right side of FIG. 15, locations at which deviation from the data for evaluation (estimated residual differences) has occurred are divided (classified), and data for estimation is selected for each divided (classified) group to create subspace data. The New Regression lines on the right side of the figure in FIG. 15 represent regression lines obtained as a result of this creation of subspace data. For example, if residual difference average value of the S1 group mentioned above is more than 3 dB, and if residual difference average value with the subspace data is less than 3 dB, the subspace data will be adopted. This makes it possible to suppress the deviation from the data for evaluation (estimated residual differences) for locations at which deviation from the data for evaluation (estimated residual differences) has occurred.

As a result of applying the present invention, as illustrated in the left figure of FIG. 16, there is a possible case where deviation from data for evaluation (estimated residual differences) may become larger in new regression line than in the original regression lines. This is due to the fact that acquisition location of the data for estimation, i.e., placement of first sensor, is not good or inappropriate data for estimation was selected accordingly, as shown in the right figure of FIG. 16. In this case, it is possible to deal with the case by not-adopting the subspace data in step S004 of FIG. 13. Of course, instead of such measures, it is also possible to reclassify the data for evaluation or re-select the data for estimation corresponding to the-data-for evaluation by changing rules (algorithms) for selecting the data for estimation.

In the examples of FIG. 15 and FIG. 16 above, spatial data and subspace data are represented by regression line(s), but the configuration of spatial data and subspace data is not limited to this, and can be a non-linear regression model. For example, given an explanatory variable such as location, various predictive models that can estimate RSSI as an objective variable can be employed.

In the above-described example embodiment, it is explained that total and average values of residual differences between subspace data and data for evaluation are used to select subspace data, but rule for selecting subspace data is not limited to this method. For example, a criterion (upper limit) may be set for the maximum absolute value of the residual differences between subspace data and data-for-evaluation, and a rule may be used to not adopt subspace data if the maximum absolute value of the residual differences exceeds the upper limit, even if the total and average values of the residual differences are suppressed.

In the above-described example embodiment, it is explained that the data-for-evaluation classifying part 106 classifies (groups) the data-for-evaluation based on residual differences between the data-for-evaluation and spatial data, but the method for classifying (grouping) data for evaluation is not limited to this. However, the method of classifying (grouping) evaluation data is not limited to this. For example, various methods can be adopted, such as classifying evaluation data based on the ratio between evaluation data and spatial data value(s).

Second Example Embodiment

Figure 17:
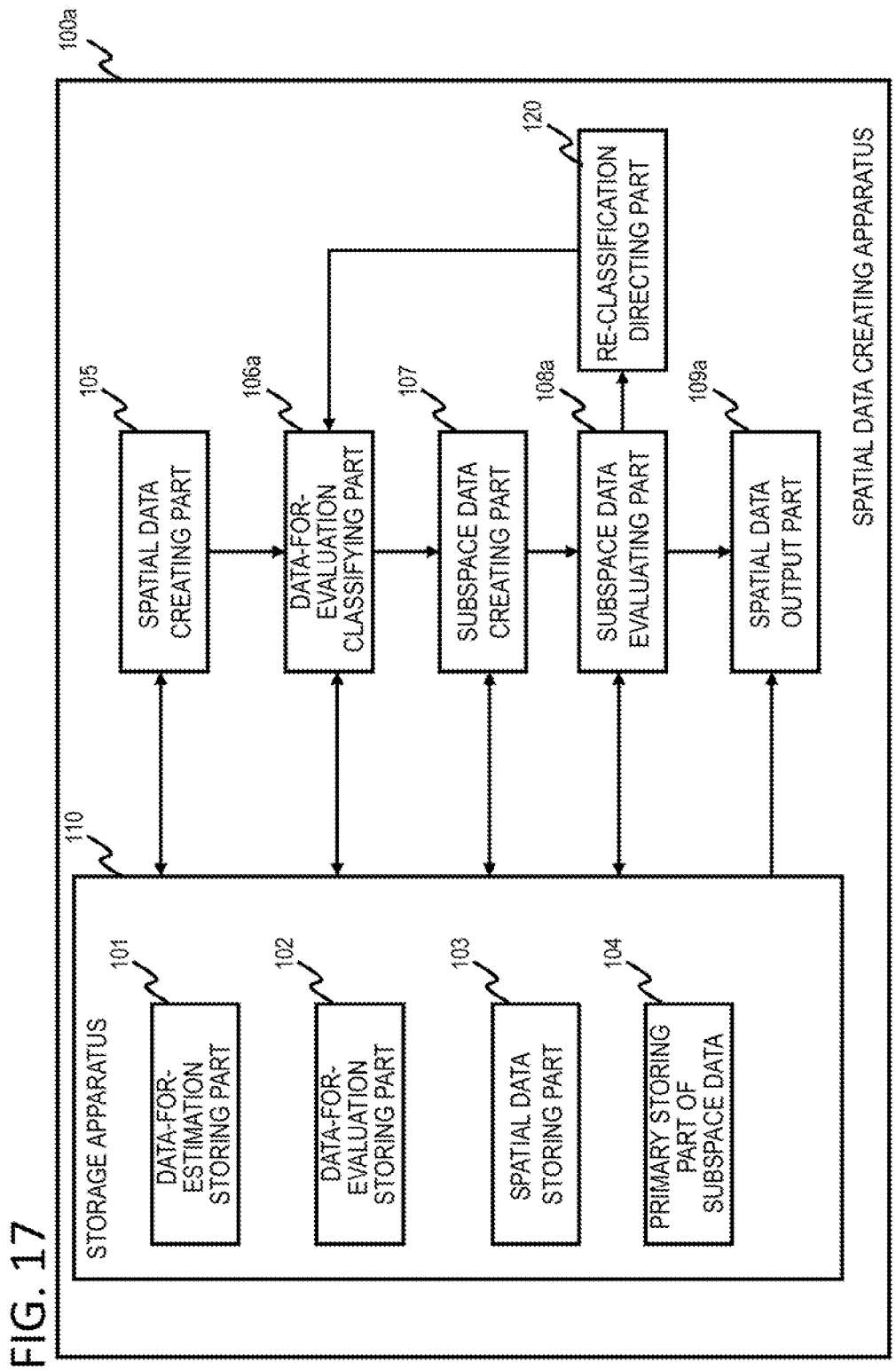
FIG. 17 is a drawing illustrating a configuration of a spatial data creating apparatus according to a second example embodiment of the present invention.

Next, a second example embodiment will be described with reference to drawings, which is expected to improve accuracy further than the first example embodiment. FIG. 17 is a drawing illustrating configuration of a spatial data creating apparatus of the second example embodiment of the present invention. The difference from the first example embodiment illustrated in FIG. 5 is that a re-classification directing part 120 is added to recursively re-classify subspace data. Since the other configurations are common to the first example embodiment, we will focus on the differences below.

The re-classification directing part 120 operates when the subspace data is determined to be adopted by the subspace data evaluating part 108*a*, and directs the data-for-evaluation classifying part 106*a* to further classify (group) the data-for-evaluation (hereinafter referred to as "re-classification directing").

Figure 18:
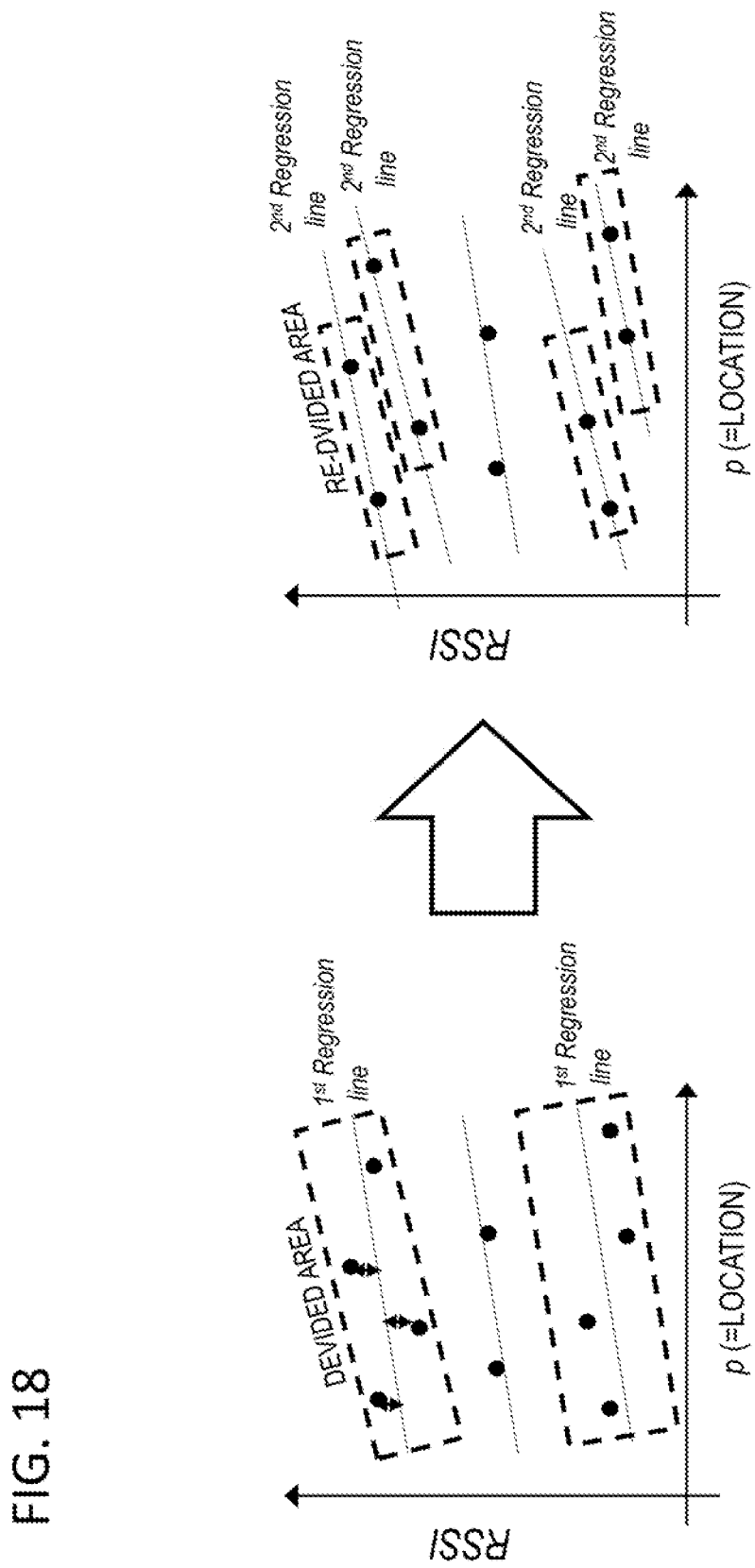
FIG. 18 is a drawing for explaining an operation of the spatial data creating apparatus according to the second example embodiment of the present invention.

Then, when creation of subspace data is completed after the re-classification direction, the data-for-evaluation classifying part 106*a* performs further classification (grouping) of the classified data for evaluation based on the difference between data for evaluation and subspace data. FIG. 18 is a drawing of the above reclassification process of data for evaluation. For example, when evaluation data and 1st Regression line are obtained as shown in the left figure of FIG. 18, the data-for-evaluation classifying part 106*a* re-classifies the data for evaluation based on residual differences between the both (see the right figure of FIG. 18).

For each of the groups after the re-classification, the subspace data creating part 107 selects the nearest estimation data from measurement locations of data for evaluation and re-create subspace data using a set of estimation data. The subspace data created by the subspace data creating part 107 is temporarily stored in the primary storing part 104 of subspace data.

The subspace data evaluating part 108*a* compares data for evaluation after reclassification with the re-created subspace data and calculates the residual differences (residual differences of subspace data). Then, the subspace data evaluating part 108*a* compares residual differences of evaluation data against the previously calculated subspace data and residual differences of subspace data and evaluation data re-created by the subspace data creating part 107. If, as a result of the comparison above, the residual difference of the subspace data is smaller, the subspace data evaluating part 108*a* determines that the subspace data is to be adopted, and directs the re-classification directing part 120 to re-classify the subspace data. Furthermore, the subspace data evaluating part 108*a* stores the subspace data after re-classification in the spatial data storing part 103. The comparison of the residual differences here is between residual differences with the 1st Regression line in the left figure of FIG. 18 and residual differences with the 2nd Regression line in the right figure of FIG. 18.

On the other hand, if residual differences of the subspace data after reclassification are larger, the subspace data evaluating part 108*a* determines that no further re-classification is to be performed. The subspace data evaluating part 108*a* does not store the subspace data after reclassification in the spatial data storing part 103.

The spatial data output part 109*a* outputs spatial data and subspace data stored in the spatial data storing part 103 after judgment by the subspace data evaluating part 108*a*.

Figure 19:
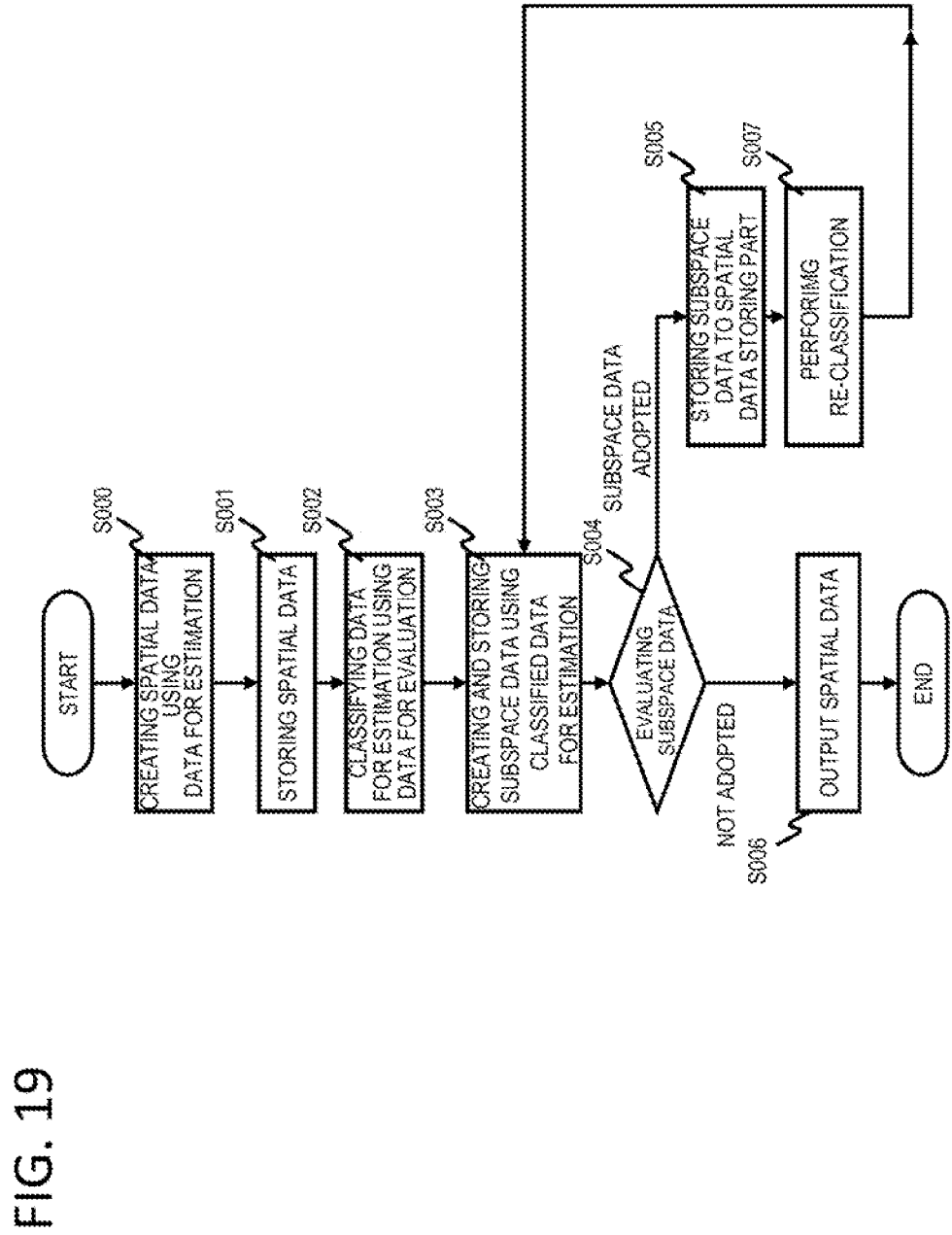
FIG. 19 is a flowchart illustrating the operation of the spatial data creating apparatus according to the second example embodiment of the present invention.

Next, operations of this example embodiment will be described in detail with reference to drawings. FIG. 19 is a flow chart representing operations of the spatial data creating apparatus 100 of the second example embodiment of the present invention. Since the operations of steps S000 to S002, S004, and S006 of FIG. 19 are the same as those of the first example embodiment, the contents of steps S003, S005, and S007 will be described below.

If it is determined that subspace data is to be adopted, the spatial data creating apparatus 100 stores subspace data in the spatial data storing part 103 (Step S005) and further performs re-classification of data for evaluation (Step S007). Here, it is assumed that the data is re-classified into four regions, as shown by broken lines in the right figure of FIG. 18.

For each of the four groups after the re-classification, the subspace data creating part 107 selects the nearest estimation data from measurement points of the data for evaluation and re-create the subspace data using the set of estimation data (Step S003). The four regression lines in FIG. 18 correspond to these four subspace data. The four subspace data created by the subspace data creating part 107 are temporarily stored in the primary storing part 104 of the subspace data.

The subspace data evaluating part 108*a* compares data-for-evaluation after re-classification with the re-created subspace data described above, and calculates the residual differences (residual differences of subspace data). Then, the subspace data evaluating part 108*a* compares the residual differences of the evaluation data against the previously calculated subspace data with residual differences between the subspace data recreated by the subspace data creating part 107 and the evaluation data (Step S004). If, as a result of the comparison, total and average values of the residual differences of the subspace data are smaller, the subspace data evaluating part 108*a* determines that the subspace data is to be adopted, and directs the re-classification directing part 120 to re-classify the subspace data. Furthermore, the subspace data evaluating part 108*a* stores the subspace data after reclassification in the spatial data storing part 103.

On the other hand, if total and average values of residual differences of the subspace data after re-classification are larger, the subspace data evaluating part 108*a* determines that no further re-classification is to be performed ("Not Adopt" in step S004). The subspace data evaluating part 108*a* does not store the subspace data after re-classification in the spatial data storing part 103.

As described above, classification of data for evaluation is performed recursively until it is determined that no further re-classification is necessary in the subspace data evaluating part 108*a*.

Finally, the spatial data creating apparatus 100 outputs spatial data saved in the spatial data storing part 103 (Step S006). At this time, if spatial data and multiple subspace data are stored in the spatial data storing part 103, the spatial data creating apparatus 100 replaces the content of the subspace data with the content of the most finely classified subspace data among the spatial data and subspace data, and outputs it. As a result, among the spatial data and the subspace data, the part(s) of the spatial data and the subspace data that is judged to have a large absolute value of residual differences in steps S002 and S007 is replaced by the finer subspace data to improve accuracy.

As described above, this example embodiment can improve estimation accuracy in comparison with the first example embodiment. The reason for this is that evaluation data is divided recursively, and this example embodiment is configured to allow accurate estimation even when there are many models in the environment.

In this example embodiment, rules for selecting subspace data are not limited to the method described above. A standard (upper limit) can also be set for maximum absolute value of residual differences, etc., between subspace data and data for evaluation. Then, even if total and average values of residual differences are suppressed, rules such as not adopting the subspace data (not re-dividing) can be used if the maximum absolute value of residual differences exceeds the upper limit.

Third Example Embodiment

Figure 20:
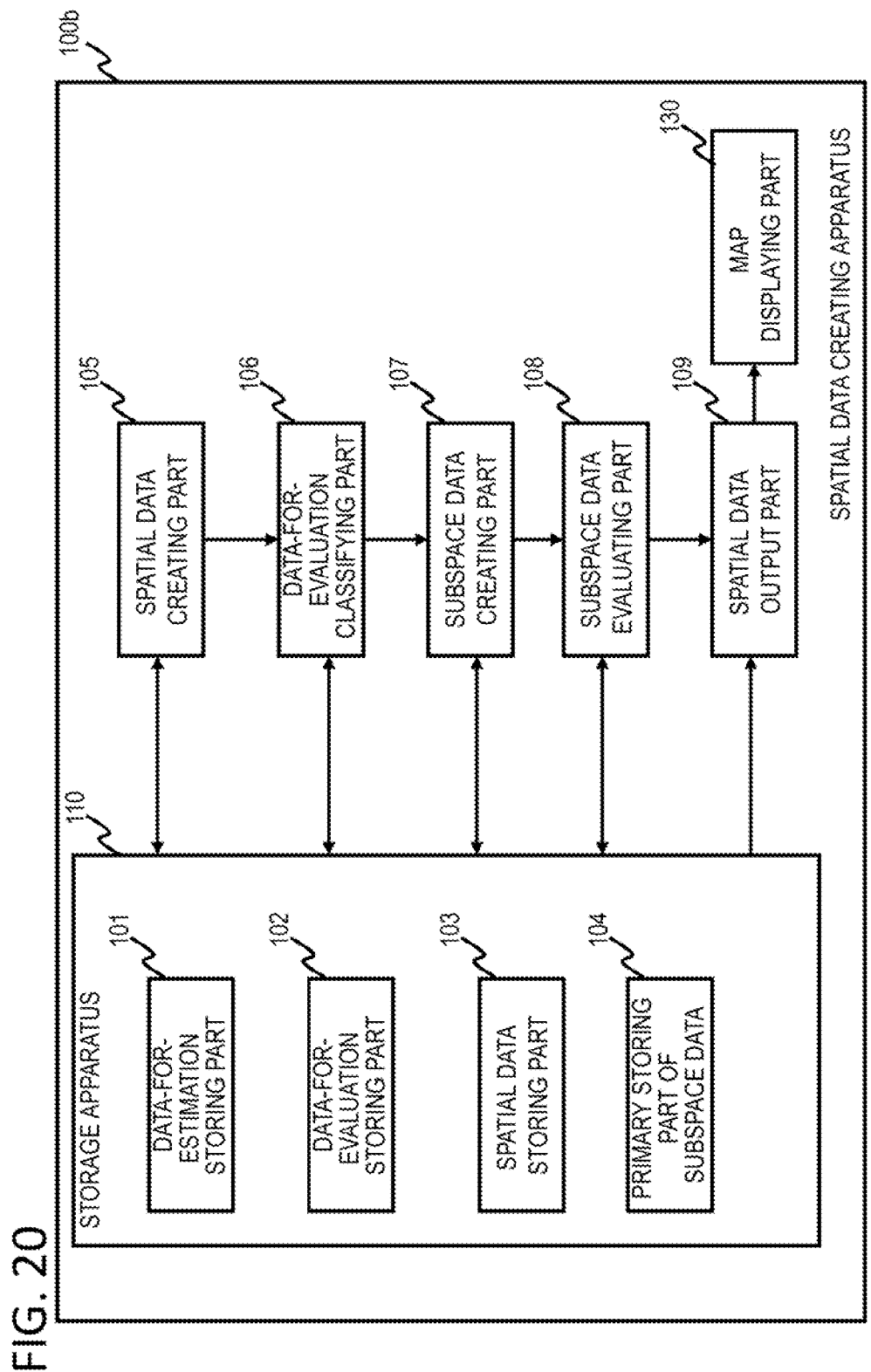
FIG. 20 is a drawing illustrating a configuration of a spatial data creating apparatus according to a third example embodiment of the present invention.

Next, a third example embodiment in which spatial data created by the present invention is applied to a radio map provision service will be described with reference to drawings. FIG. 20 is a drawing illustrating the configuration of the spatial data creating apparatus of the third example embodiment of the present invention. The difference from the first example embodiment illustrated in FIG. 5 is that a map displaying part 130 is added. Since the other configurations are common to the first example embodiment, we will focus on the differences below.

The map displaying part 130 converts subspace data output by the spatial data output part 109 into a radio wave map format and outputs it to a predetermined display device, etc. (not shown).

Figure 21:
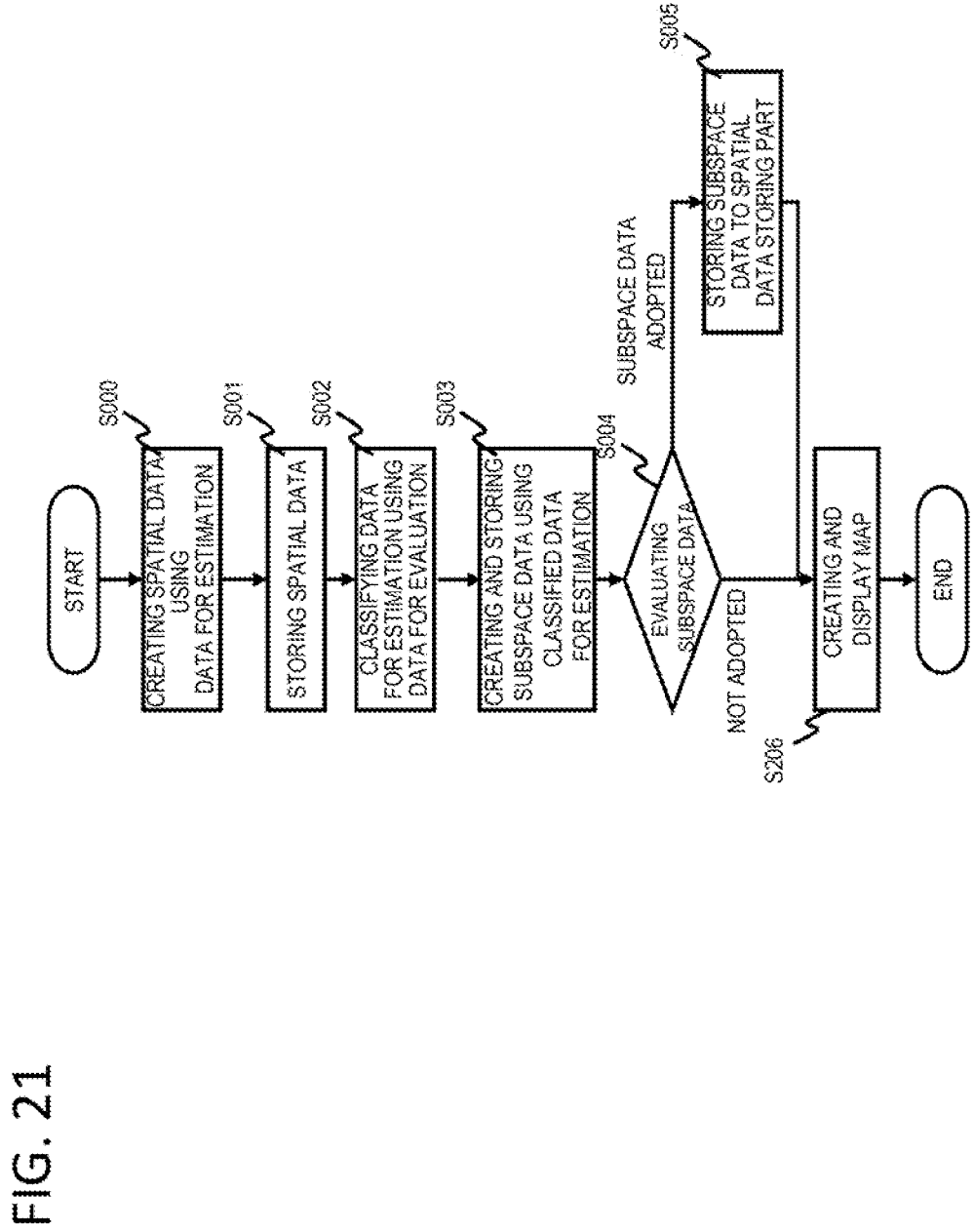
FIG. 21 is a flowchart illustrating an operation of the spatial data creating apparatus according to the third example embodiment of the present invention.

Operations of this example embodiment are described in detail with reference to drawings. FIG. 21 is a flow chart representing operations of the spatial data creating apparatus 100*b* according to the third example embodiment of the present invention. Since operations from step S000 to S005 in FIG. 19 are the same as in the first example embodiment, details of step S206 will be described below.

In step S206, the map displaying part 130 of the spatial data creating apparatus 100*b* creates and outputs a radio wave map using the data received from the spatial data output part 109. FIG. 22 is a drawing illustrating an example of output form of radio wave map. In the radio wave map in FIG. 22, RSSI strength is represented by contour lines. The "H" in the figure indicates a peak of location where RSSI is high, and the "L" indicates a peak (bottom) of location where RSSI is low. Furthermore, these contour lines are not created by a single model as described in the first example embodiment, but are contour lines that have been properly classified and modified by subspace data.

Accordingly, this example embodiment makes it possible to display spatial data with improved accuracy in a form that is easy for user to grasp visually. Note that a configuration in which a map displaying part 130 is added to the configuration of the second example embodiment to display a radio wave map can also be naturally adopted.

Fourth Example Embodiment

Figure 23:
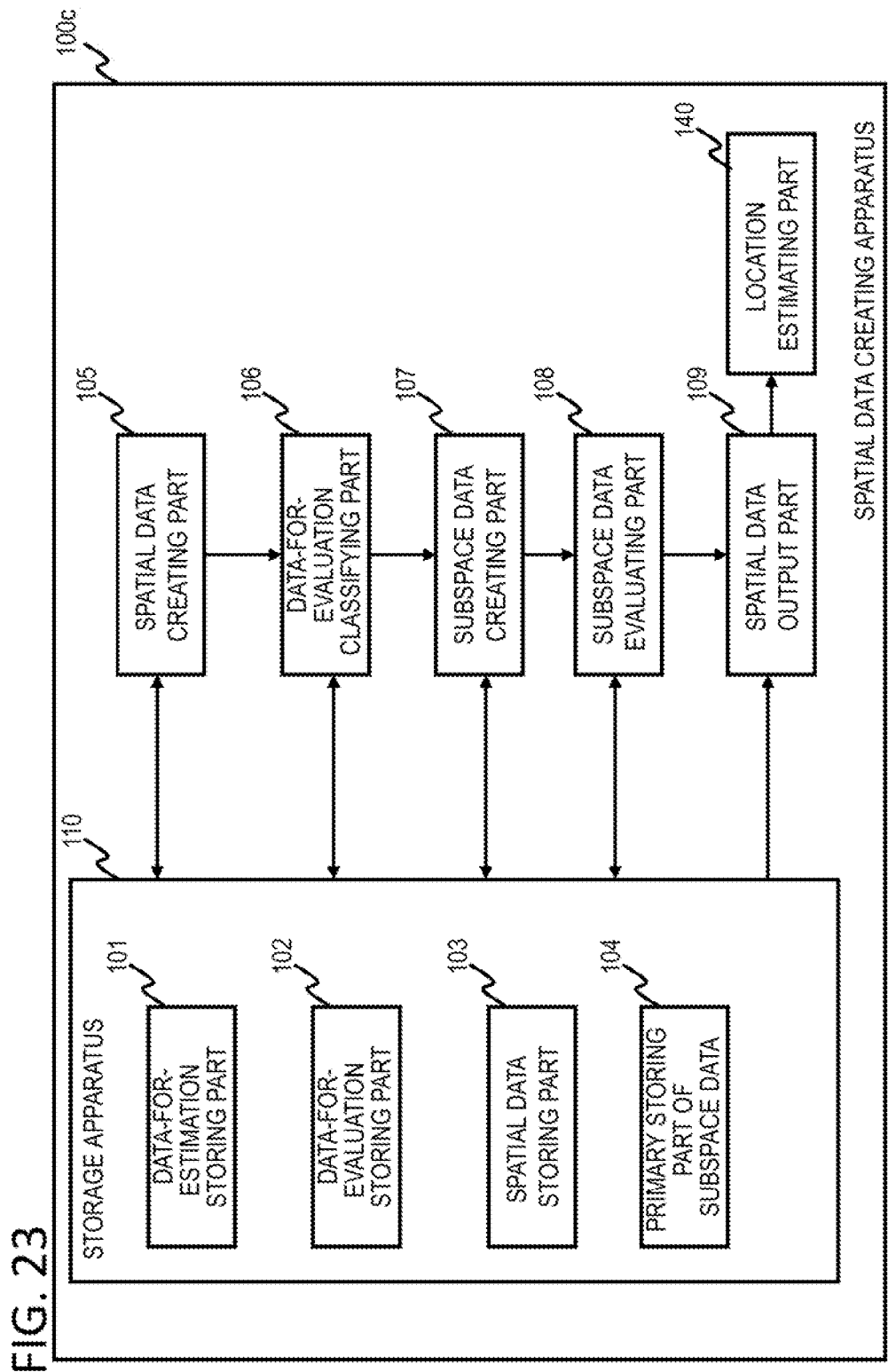
FIG. 23 is a drawing illustrating a configuration of a spatial data creating apparatus according to a fourth example embodiment of the present invention.

Next, a fourth example embodiment in which spatial data created by the present invention is used to estimate (locate) location of a moving body will be described with reference to drawings. FIG. 23 is a drawing illustrating a configuration of the spatial data creating apparatus of the fourth example embodiment of the present invention. The difference from the first example embodiment illustrated in FIG. 5 is that the location estimating part 140 is added. Since the other configurations are common to the first example embodiment, we will focus on the differences below.

The location estimating part 140 estimates location of a moving body (or bodies) using subspace data output by the spatial data output part 109, and outputs results of the location estimation to a predetermined display device, etc. (not shown).

Figure 24:
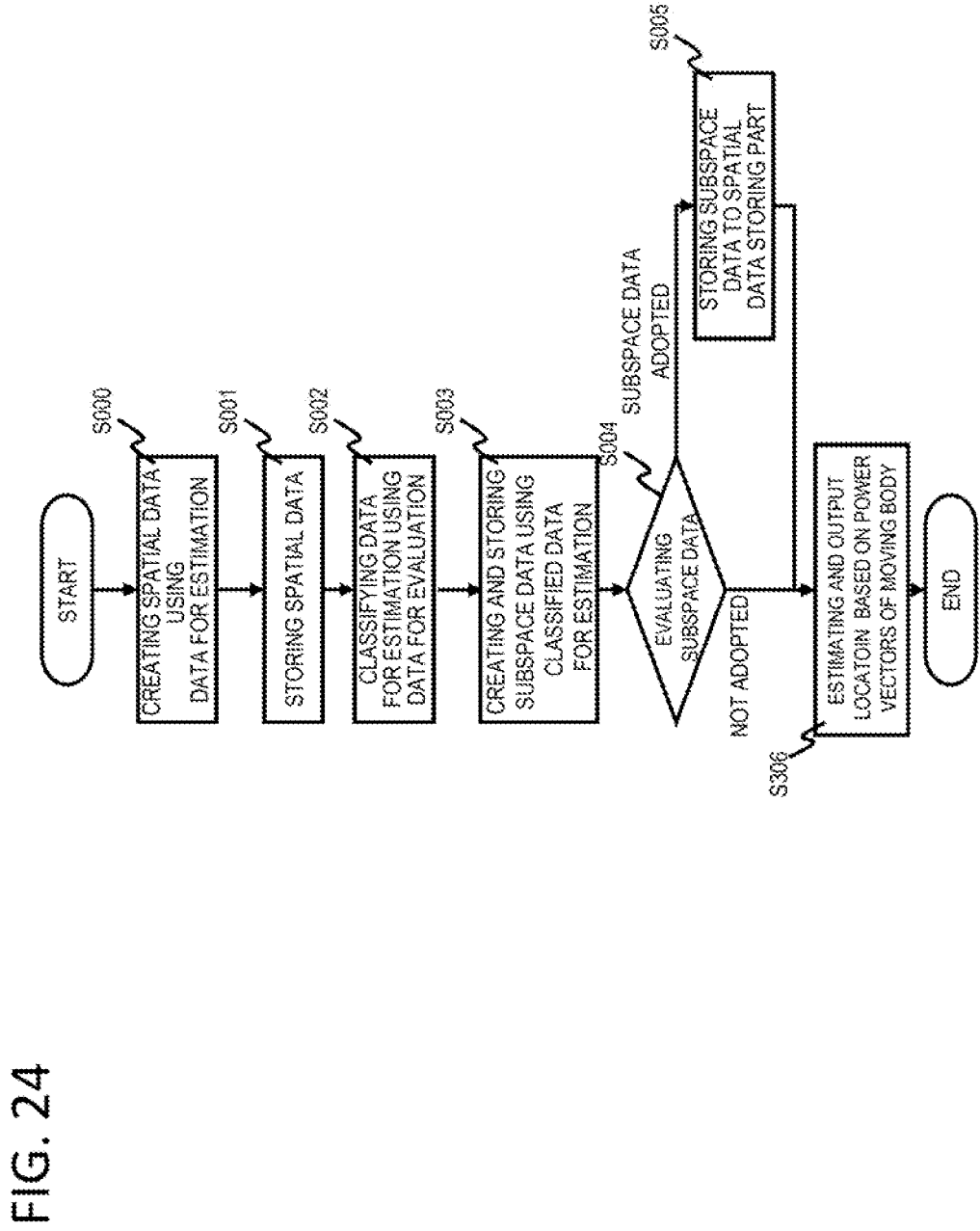
FIG. 24 is a flowchart illustrating an operation of the spatial data creating apparatus according to the fourth example embodiment of the present invention.

Next, operations of this example embodiment will be described in detail with reference to the drawings. FIG. 24 is a flow chart representing operations of the spatial data creating apparatus 100*c* of the fourth example embodiment of the present invention. Since the operations from step S000 to S005 in FIG. 24 are the same as these in the first example embodiment, details of step S306 will be described below.

Figure 25:
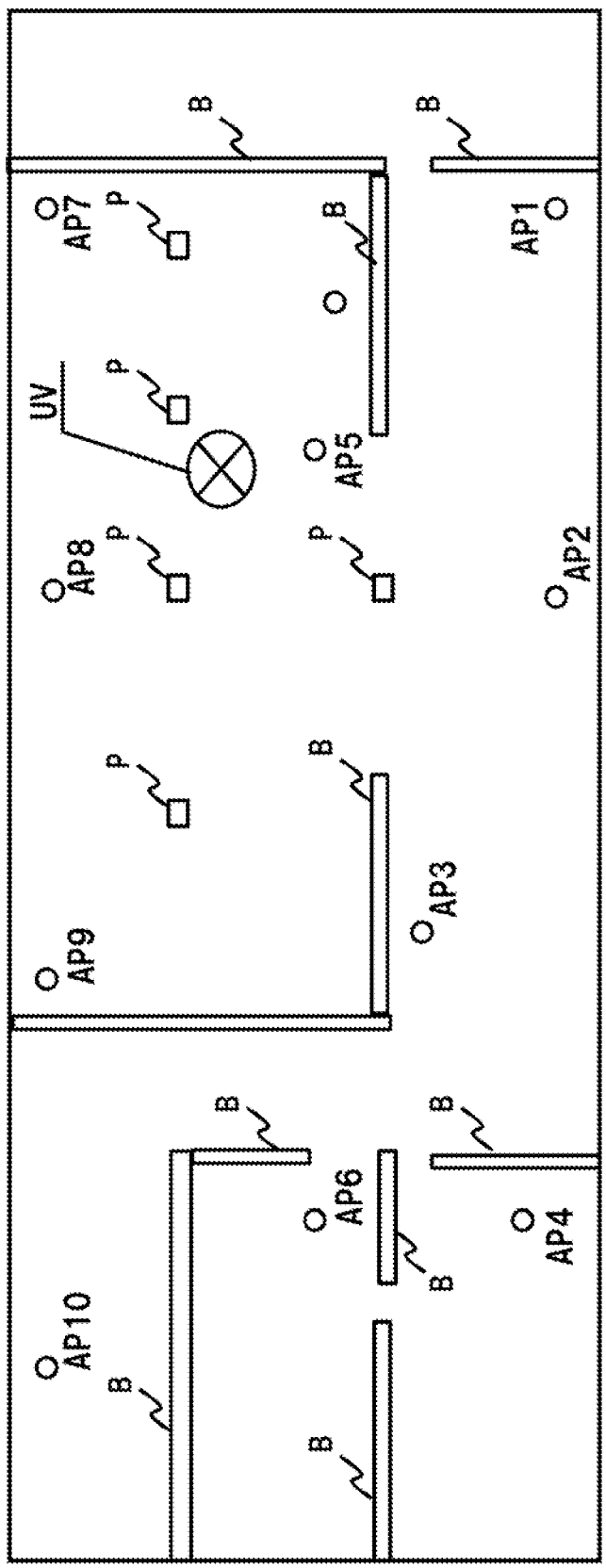
FIG. 25 is a drawing illustrating an example of a display form of an estimated location of a moving body according to the fourth example embodiment of the present invention.

In step S306, the location estimating part 140 of the spatial data creating apparatus 100*c* estimates and outputs a location corresponding to received power vectors of a moving body using data received from the spatial data output part 109. FIG. 25 is a drawing illustrating an example of output form of location estimation information of a moving body. In the example of FIG. 25, a map of target area is shown with estimated location of the moving body indicated by code UV. And this estimated location is not created by a single model, as described in the first example embodiment, but is a location identified by spatial data that is properly classified and modified by subspace data.

Therefore, according to this example embodiment, it is possible to perform highly accurate location estimation. A configuration in which the location estimating part 140 is added to the configuration of the second example embodiment to estimate the location of the mobile station can naturally be adopted.

Fifth Example Embodiment

In the above first through fourth example embodiments, the description is based on the premise that evaluation data for evaluating subspace data is available in advance, but depending on environment, it may not be possible to prepare sufficient evaluation data. The fifth example embodiment, which enables evaluation of subspace data even in such a situation, is described below.

Figure 26:
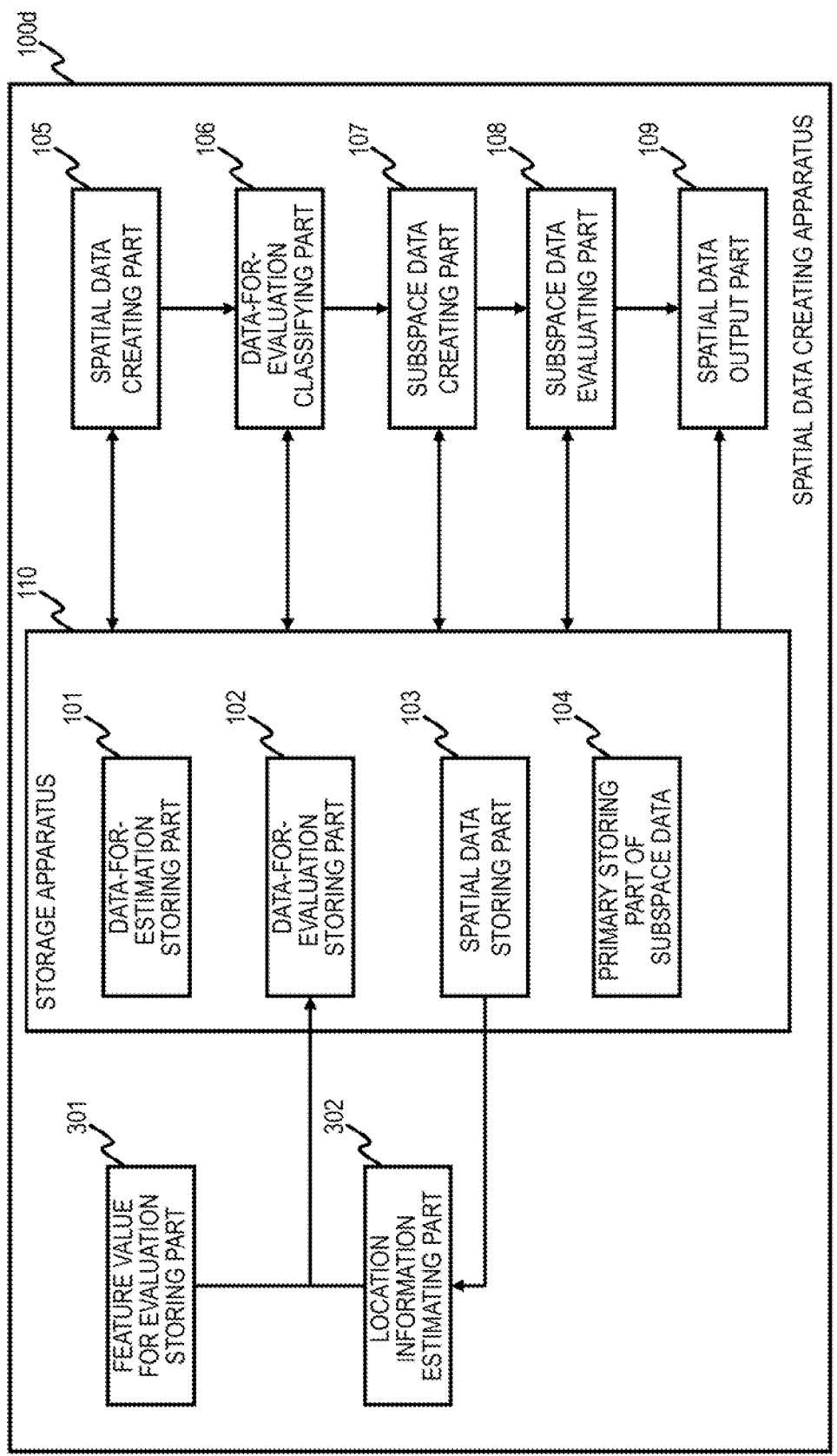
FIG. 26 is a drawing illustrating a configuration of a spatial data creating apparatus according to a fifth example embodiment of the present invention.

FIG. 26 is a drawing illustrating a configuration of a spatial data creating apparatus of a fifth example embodiment of the present invention. The difference from configuration of the first example embodiment illustrated in FIG. 5 is that the spatial data creating apparatus 100*d* has a feature value-for-evaluation storing part 301 and a location information estimating part 302. Since the other configurations are common to the first example embodiment, the differences are mainly described below.

The feature value-for-evaluation storing part 301 stores information of feature values to be used as data-for-evaluation. For example, the feature value-for-evaluation storing part 301 stores received power vectors, which are a set of RSSI of radio waves received from each AP.

The location information estimating part 302 estimates location information at the timing when spatial data held in the spatial data storing part 103 is updated, using spatial data and information on feature values held in the feature value-for-evaluation storing part 301, wherein the location information is assumed to have been used for obtaining information on feature values. This location information can be estimated using FingerPrint method or other methods. Then, the location information estimating part 302 creates data-for-evaluation by associating estimated location information with information on related feature values, and registers it in the data-for-evaluation storing part 102.

Figure 27:
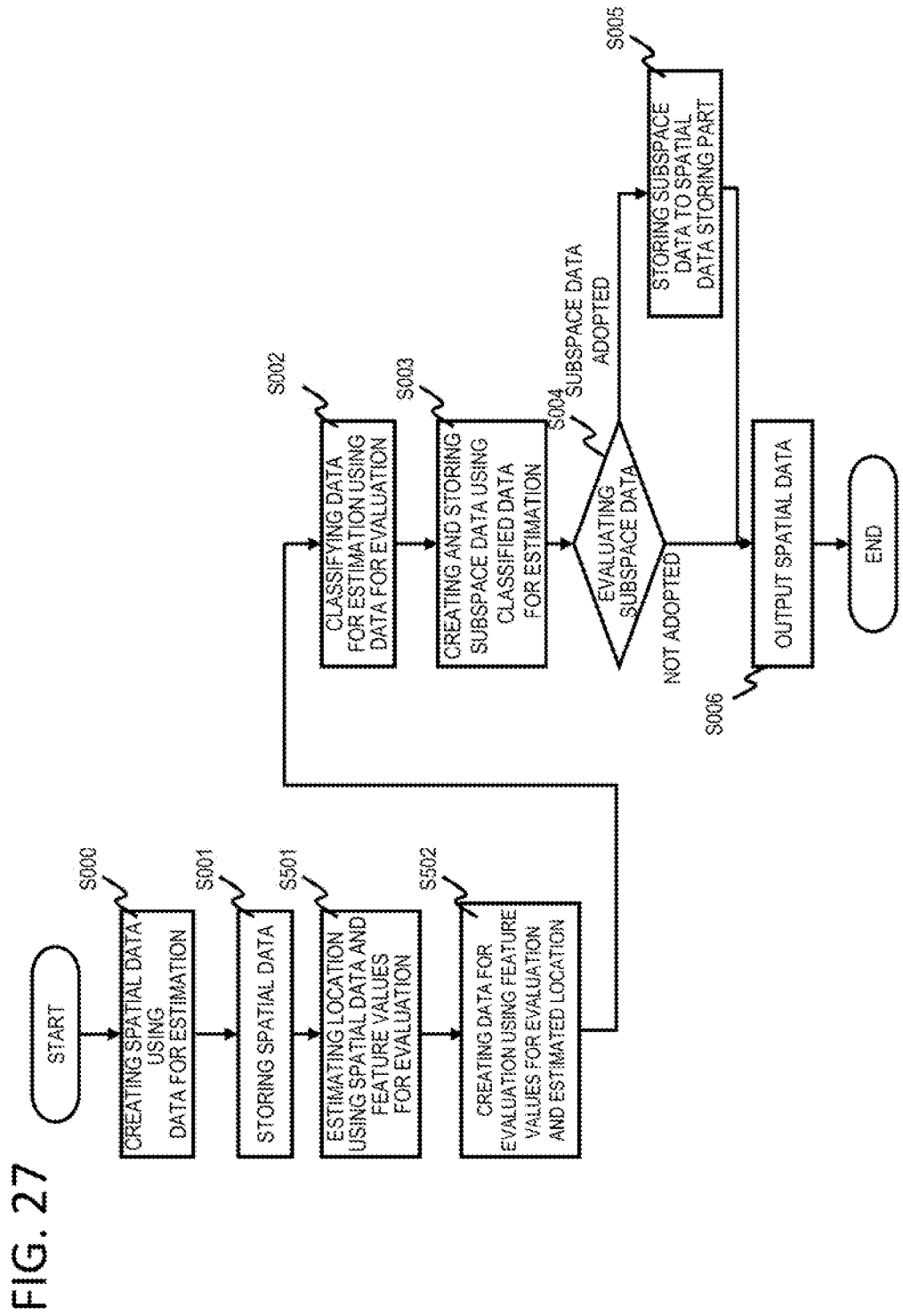
FIG. 27 is a flowchart illustrating an operation of the spatial data creating apparatus according to the fifth example embodiment of the present invention.

Next, operations of this example embodiment will be described in detail with reference to drawings. FIG. 27 is a flow chart representing operations of the spatial data creating apparatus 100*d* of the fifth example embodiment of the present invention. The difference from the first example embodiment is that steps S501 and S502 are added between steps S001 and S002. The details of steps S501 and S502 are described below.

As in the first example embodiment, when the spatial data creating apparatus 100*d* creates and stores spatial data (steps S000 and S001), it uses the spatial data and feature values for evaluation to estimate a location at which feature values for evaluation would have been obtained (step S501).

Next, the spatial data creating apparatus 100*d* generates data for evaluation by mapping feature value(s) for evaluation to estimated location(s), and stores the data in the data-for-evaluation storing part 102 (Step S502).

The above-described procedure enables the spatial data creating apparatus 100*d* to calculate residual differences between created spatial data and evaluation data in the data-for-evaluation storing part 102 in next step S002.

As described above, this example embodiment can improve accuracy of spatial data estimation even when it is not possible to prepare data for evaluation. The reason for this is that it is configured to use feature values for evaluation to estimate location(s) at which feature value(s) would have been acquired, and to generate data-for-evaluation that is associated to location information.

Figure 28:
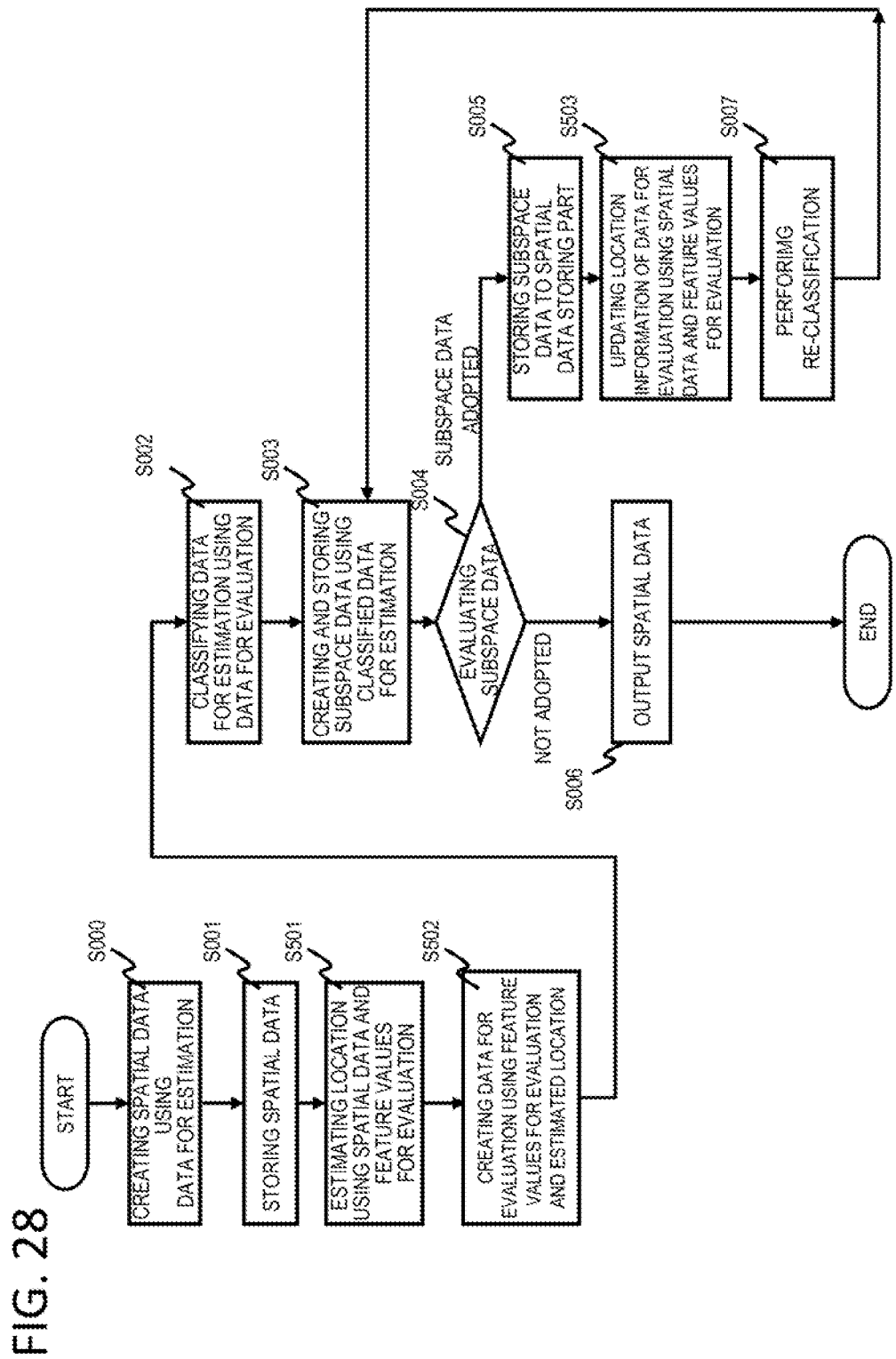
FIG. 28 is a flowchart illustrating another operation of the spatial data creating apparatus according to the fifth example embodiment of the present invention.

In the above description, it was assumed that the feature values for evaluation storing part 301 and the location information estimating part 302 are added to the configuration of the first example embodiment. In this case, as illustrated in FIG. 28, in addition to creation of the data for evaluation in steps S501 and S502, a step of updating location of data for evaluation may be added between steps S005 and S007. By making this preparation, it is possible to update location information of data for evaluation in the procedure of recursive classification of data for evaluation, thereby improving accuracy.

Each of the example embodiments of the present invention is described above. However, the present invention is not limited to the embodiments described above, and further variations, substitutions, and adjustments can be made to the extent that the basic technical idea of the present invention is not deviated from. For example, the apparatus configuration, configuration of each element, displayed data, and other forms of expression shown in each drawing are examples to help understand the invention, and are not limited to the configuration illustrated in these drawings.

For example, in the example embodiments described above, it was assumed that data for estimation and data for evaluation are feature values (received signal strength) associated with location information, but the scope of application of the present invention is not limited to estimation of received signal strength and location estimation using this. For example, by using sunshine and wind power information as feature values associated with location information, it is possible to create an estimation map of sunshine and wind power with a limited number of sensors. In these cases as well, accuracy of prediction of spatial data (sunshine and wind speed) for the entire target area can be improved by classifying evaluation data by deviation from spatial data. Similarly, by using the exploratory value of mineral resources as a feature associated with location information, it is possible to create an estimated resource map with a limited number of exploratory (boring) points.

Figure 29:
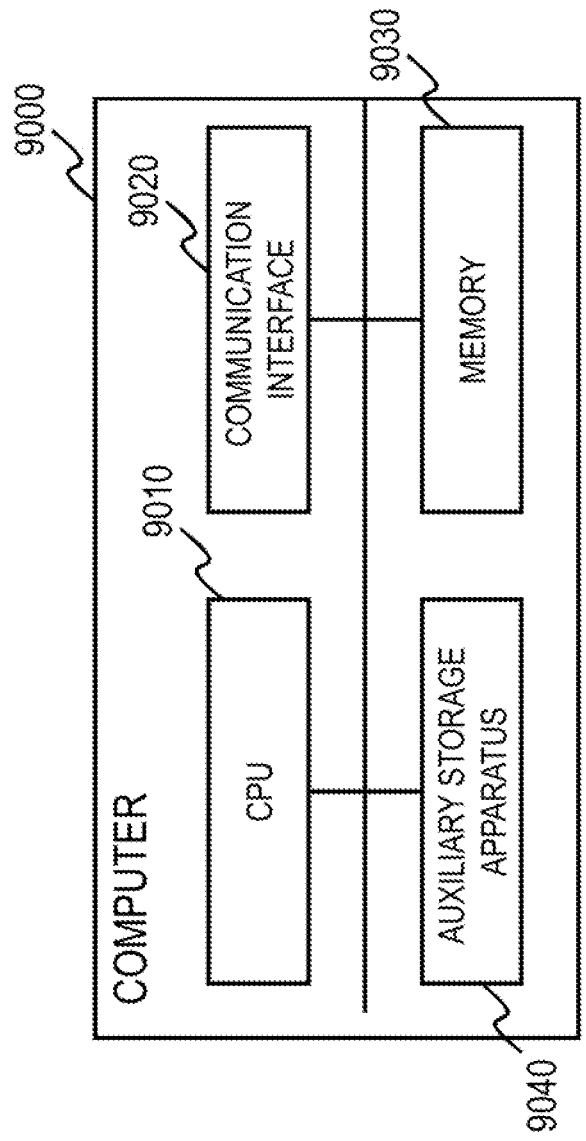
FIG. 29 is a drawing illustrating a configuration of a computer configuring a spatial data creating apparatus of the present invention.

Further, the procedures illustrated in the first through fifth example embodiments described above can be realized by a program that causes a computer (9000 in FIG. 29) that functions as a spatial data creating apparatus to function as the same apparatus. Such a computer is exemplified by configuration with a CPU (Central Processing Unit) 9010, a communication interface 9020, a memory 9030, and an auxiliary storage apparatus 9040 in FIG. 29. That is, the CPU 9010 of FIG. 29 can be used to execute domain partitioning program and spatial data creating program, and to perform update processing of each calculation parameter held in the auxiliary storage apparatus 9040, etc. thereof.

That is, each part (processing method, function) of the spatial data creating apparatus shown in the first through fifth example embodiments above can be realized by a computer program that causes a processor installed in the spatial data creating apparatus to execute each of the above-mentioned processes using its hardware.

Finally, preferred modes of the present invention will be summarized.

[Mode 1]

(Refer to the spatial data creating apparatus according to the first aspect.)

[Mode 2]

The above described first sensor group and second sensor group of the spatial data creating apparatus are receiving apparatuses that receive radio wave transmitted from a prescribed transmitting station, and the data for estimation and the data for evaluation can be data that associates power reception strength measured by the receiver with the location of sensors of the first sensor group and the second sensor group.

[Mode 3]

The above described data classifying part of spatial data creating apparatus can be configured to classify the data for evaluation based on difference or ratio between the data for evaluation and the spatial data corresponding to the location at which the data for evaluation is acquired.

[Mode 4]

The above described spatial data creating apparatus may further comprise an output part that outputs the spatial data in a predetermined manner.

[Mode 5]

The above described spatial data creating apparatus may further comprise a map displaying part that visualizes and displays spatial data including subspace data adopted by the subspace data evaluating part.

[Mode 6]

The above described spatial data creating apparatus may further comprise a location estimating part that estimates location of a moving body by collating the spatial data and sensor value acquired by the moving body, and the location estimating part estimates location of the moving body using the spatial data including the subspace data adopted by the subspace data evaluating part, and provides the estimated location of the moving body as location information of the moving body.

[Mode 7]

The above described spatial data creating apparatus can be further configured to have a location information estimating part that estimates location at which feature values prepared in advance are acquired by collating the spatial data with the feature values and creates the data for evaluation.

[Mode 8]

(Refer to the spatial data creating method according to the second aspect.)

[Mode 9]

(Refer to the program according to the third aspect.)

Note that, like Mode 1, Modes 8 to 9 can be developed into Modes 2 to 7.

Note that each disclosure of Patent Literatures cited above is incorporated herein in its entirety by reference thereto, and may be used as a basis or part of the present invention as necessary. It is possible to modify and adjust the example embodiments or examples within the whole disclosure of the invention (including the claims) and based on the basic technical concept thereof. Further, it is possible to variously combine or select (or partially delete) a wide variety of disclosed elements (including the individual elements of the individual claims, the individual elements of the example embodiments or examples, and the individual elements of the individual figures) within the scope of the disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed, even without specific recital thereof. In addition, each of the disclosures in the above-cited literatures may be used, if necessary, as part of the disclosure of the present invention according to the purpose of the present invention, in part or in whole, in combination with the descriptions in this document, and shall be deemed to be included in the disclosure of the present application.

INDUSTRIAL APPLICABILITY

This invention can be applied to applications such as consulting, design, and indoor/outdoor location-based services using spatial data obtained through spatial data estimation.

SIGNS LIST 10, 100, 100a-100d: spatial data creating apparatus
11: receiving part
12: data classifying part
13: subspace data creating part
14: subspace data evaluating part
101: data-for-estimation storing part
102: data-for-evaluation storing part
103: spatial data storing part
104: primary storing part of subspace data
105: spatial data creating part
106, 106a: data-for-evaluation classifying part
107: subspace data creating part
108, 108a: subspace data evaluating part
109, 109a: spatial data output part
110: storage apparatus
120: re-classification directing part
130: map displaying part
140: location estimating part
301: feature value for evaluation storing part
302: location information estimating part
AP1-AP10: access point
LN1-LN29: measurement point
P: pillar
B: barrier
9000: computer
9010: CPU
9020: communication interface
9030: memory
9040: auxiliary storage apparatus

The invention claimed is:

1. A spatial data creating apparatus comprising:
at least a processor; and
a memory in circuit communication with the processor,
wherein the processor is configured to execute program instructions stored in the memory to:
receive data for estimation and data for evaluation, the data for estimation used to create spatial data that associate a location of a target area with a value relating to the location based on data acquired from a first group of sensors installed in the target area, the data for evaluation acquired from a second group of sensors installed at a location that is different from a location at which the first group of sensors are installed in the target area;
create the spatial data from the data for estimation;
classify the data for evaluation into classified groups based on a difference between the data for evaluation and the value relating to the location at which the data for evaluation is acquired;

create subspace data that forms a part of the spatial data using data, from among the data of estimation acquired from the first group of sensors, which is selected based on the location at which the data for evaluation is acquired from the second group of sensors, for each of the classified groups; and determine whether or not the subspace data is to be adopted by comparing a first difference between the data for evaluation and the spatial data with a second difference between the data for evaluation and the subspace data.

2. The spatial data creating apparatus according to claim 1, wherein the first sensor group and the second sensor group are receiving apparatuses that receive radio wave transmitted from a prescribed transmitting station, and the data for estimation and the data for evaluation associate power reception strength measured by the receiving apparatuses with the locations of the first sensor group and the second sensor group.

3. The spatial data creating apparatus according to claim 1, wherein the processor classifies the data for evaluation based on a residual or a ratio between the data for evaluation and the spatial data corresponding to the location at which the data for evaluation is acquired.

4. The spatial data creating apparatus according to claim 1, wherein the processor is further configured to execute the program instructions to:

output the spatial data in a predetermined manner.

5. The spatial data creating apparatus according to claim 4, wherein the processor is further configured to execute the program instructions to:

visualize and display the spatial data including the subspace data.

6. The spatial data creating apparatus according to claim 1, wherein the processor is further configured to execute the program instructions to:

estimate a location of a moving body by collating the spatial data and a sensor value acquired by the moving body, wherein the processor estimates the location of the moving body using the spatial data including the subspace data and provides the estimated location of the moving body as location information of the moving body.

7. The spatial data creating apparatus according to claim 1, wherein the processor is further configured to execute the program instructions to:

estimate a location at which feature values prepared in advance are acquired by collating the spatial data with the feature values; and create the data for evaluation, wherein the data for estimation refers to data that maps the location of the first group of sensors in the target area that are sampled to perform spatial data estimation to the feature values, and the data for evaluation is data that maps feature values measured by the second group of sensors located in the target area to the location of the second group of sensors, and the evaluation data is used to adopt or reject the subspace data.

8. A spatial data creating method performed by a computer and comprising:

receiving data for estimation and data for evaluation, the data for estimation used to create spatial data that associate a location of a target area with a value relating to the location based on data acquired from a first group of sensors installed in the target area, the data for evaluation acquired from a second group of sensors installed at a location that is different from a location at which the first group of sensors are installed in the target area;

creating the spatial data from the data for estimation;

classifying the data for evaluation into classified groups based on a difference between the data for evaluation and the value relating to the location at which the data for evaluation is acquired;

creating subspace data that forms a part of the spatial data using data, from among the data of estimation acquired from the first group of sensors, which is selected based on the location at which the data for evaluation is acquired from the second group of sensors, for each of the classified groups; and determining whether or not the subspace data is to be adopted by comparing a first difference between the data for evaluation and the spatial data with a second difference between the data for evaluation and the subspace data.

9. The spatial data creating method according to claim 8, further comprising:

receiving, by the first group of sensors and the second group of sensors, radio wave transmitted from a prescribed transmitting station; and associating power reception strength measured by receiving apparatuses with the locations of the first sensor group and the second sensor group.

10. The spatial data creating method according to claim 8, further comprising:

classifying the data for evaluation based on a residual or a ratio between the data for evaluation and the spatial data corresponding to the location at which the data for evaluation is acquired.

11. The spatial data creating method according to claim 8, further comprising:

outputting the spatial data in a predetermined manner.

12. The spatial data creating method according to claim 11, further comprising:

visualizing and displaying the spatial data including the subspace data.

13. The spatial data creating method according to claim 8, further comprising:

estimating a location of a moving body by collating the spatial data and sensor value acquired by the moving body;

estimating the location of the moving body using the spatial data including the subspace data; and providing the estimated location of the moving body as location information of the moving body.

14. The spatial data creating method according to claim 8, further comprising:

estimating a location at which feature values prepared in advance are acquired by collating the spatial data with the feature values; and creating the data for evaluation, wherein the data for estimation refers to data that maps the location of the first group of sensors in the target area that are sampled to perform spatial data estimation to the feature values, and the data for evaluation is data that maps feature values measured by the second group of sensors located in the target area to the location of the second group of sensors, and the evaluation data is used to adopt or reject the subspace data.

15. A non-transitory computer readable recording medium storing a program executable by a computer to perform processing comprising:
- receiving data for estimation and data for evaluation, the data for estimation used to create spatial data that associate a location of a target area with a value relating to the location based on data acquired from a first group of sensors installed in the target area, the data for evaluation acquired from a second group of sensors installed at a location that is different from a location at which the first group of sensors are installed in the target area;
- creating the spatial data from the data for estimation;
- classifying the data for evaluation into classified groups based on a difference between the data for evaluation and the value relating to the location at which the data for evaluation is acquired;
- creating subspace data that forms a part of the spatial data using data, from among the data of estimation acquired from the first group of sensors, which is selected based on the location at which the data for evaluation is acquired from the second group of sensors, for each of the classified groups; and
- determining whether or not the subspace data is to be adopted by comparing a first difference between the data for evaluation and the spatial data with a second difference between the data for evaluation and the subspace data.

16. The non-transitory computer readable recording medium according to claim 15, wherein the processing further comprises:
- receiving, by the first group of sensors and the second group of sensors, radio wave transmitted from a prescribed transmitting station; and
- associating power reception strength measured by receiving apparatuses with the locations of the first sensor group and the second sensor group.

17. The non-transitory computer readable recording medium according to claim 15, wherein the processing further comprises:
- classifying the data for evaluation based on a residual or a ratio between the data for evaluation and the spatial data corresponding to the location at which the data for evaluation is acquired.

18. The non-transitory computer readable recording medium according to claim 15, wherein the processing further comprises:
- outputting the spatial data in a predetermined manner.

19. The non-transitory computer readable recording medium according to claim 18, wherein the processing further comprises:
- visualizing and displaying the spatial data including the subspace data.

20. The non-transitory computer readable recording medium according to claim 15, wherein the processing further comprises:
- estimating a location of a moving body by collating the spatial data and sensor value acquired by the moving body;
- estimating the location of the moving body using the spatial data including the subspace data; and
- providing the estimated location of the moving body as location information of the moving body.

* * * * *